US011638281B2

(12) United States Patent
Mo et al.

(10) Patent No.: US 11,638,281 B2
(45) Date of Patent: Apr. 25, 2023

(54) METHOD AND APPARATUS FOR A USER EQUIPMENT SUB-CHAIN BEAM CODEBOOK DESIGN AND OPERATION

(71) Applicant: Samsung Electronics Co., Ltd., Suwon-si (KR)

(72) Inventors: Jianhua Mo, Allen, TX (US); Boon Loong Ng, Plano, TX (US); Anum Ali, Plano, TX (US); Vutha Va, Plano, TX (US); Daehee Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/445,583

(22) Filed: Aug. 20, 2021

(65) Prior Publication Data

US 2022/0159684 A1    May 19, 2022

Related U.S. Application Data

(60) Provisional application No. 63/115,865, filed on Nov. 19, 2020.

(51) Int. Cl.
*H04W 72/12* (2009.01)
*H04W 72/1268* (2023.01)
*H04L 5/00* (2006.01)
*H04W 52/02* (2009.01)
*H04B 7/0408* (2017.01)
*H04B 7/0456* (2017.01)

(52) U.S. Cl.
CPC ...... *H04W 72/1268* (2013.01); *H04B 7/0408* (2013.01); *H04L 5/0058* (2013.01); *H04W 52/0261* (2013.01); *H04B 7/0456* (2013.01)

(58) Field of Classification Search
CPC .......... H04W 72/1268; H04W 52/0261; H04B 7/0408; H04B 7/0456; H04B 7/0465; H04B 7/0473; H04B 7/0482; H04B 7/0691; H04B 7/0695; H04B 7/0874; H04B 7/088; H04L 5/0058; H04L 5/0007; H04L 5/0014; H04L 5/0048; Y02D 30/70
See application file for complete search history.

(56) References Cited

U.S. PATENT DOCUMENTS

| | | | |
|---|---|---|---|
| 9,391,682 B2 | 7/2016 | Kakishima et al. | |
| 9,929,791 B2 | 3/2018 | Seol et al. | |
| 10,341,014 B2* | 7/2019 | Zhu | H04B 7/0434 |
| 10,491,278 B2 | 11/2019 | Chen et al. | |
| 10,820,323 B2* | 10/2020 | Ho | H04B 7/0695 |
| 10,862,570 B1 | 12/2020 | Cheraghi et al. | |
| 2011/0261713 A1* | 10/2011 | Kishiyama | H04W 72/1226 370/252 |

(Continued)

OTHER PUBLICATIONS

International Search Report and Written Opinion dated Feb. 14, 2022 regarding International Application No. PCT/KR2021/015646, 9 pages.

*Primary Examiner* — Afshawn M Towfighi

(57) ABSTRACT

A user equipment (UE) is configured to vary a number of chains in uplink or downlink communications with a base station (BS). The UE includes a processor coupled to a transceiver. The processor is configured to: identify a full-chain beam for a downlink reception based on a beam sweeping; determine a number of activated chains for an uplink transmission; and determine a sub-chain uplink transmission beam.

20 Claims, 14 Drawing Sheets

(56) References Cited

U.S. PATENT DOCUMENTS

| | | | |
|---|---|---|---|
| 2013/0016690 A1* | 1/2013 | Jeong | H04W 24/10 370/329 |
| 2013/0301454 A1* | 11/2013 | Seol | H04B 7/0695 370/252 |
| 2017/0111149 A1* | 4/2017 | Kim | H04B 7/0634 |
| 2018/0227035 A1 | 8/2018 | Cheng et al. | |
| 2018/0279311 A1* | 9/2018 | Yoo | H04B 17/11 |
| 2019/0260453 A1* | 8/2019 | Huang | H04B 7/0456 |
| 2019/0364567 A1* | 11/2019 | Zhang | H04W 8/24 |
| 2019/0379427 A1 | 12/2019 | Geekie et al. | |
| 2020/0037297 A1 | 1/2020 | Pan et al. | |
| 2020/0053717 A1 | 2/2020 | Zhou et al. | |
| 2020/0145080 A1 | 5/2020 | Tang et al. | |
| 2020/0266873 A1 | 8/2020 | Lim et al. | |
| 2020/0367230 A1* | 11/2020 | Raghavan | H04B 7/0408 |
| 2020/0412425 A1* | 12/2020 | Laghate | H04W 72/046 |
| 2022/0166471 A1* | 5/2022 | Abraha | H04B 7/0413 |
| 2022/0201606 A1* | 6/2022 | Shafin | H04L 43/0852 |

\* cited by examiner

METHOD AND APPARATUS FOR A USER EQUIPMENT SUB-CHAIN BEAM CODEBOOK DESIGN AND OPERATION

CROSS-REFERENCE TO RELATED APPLICATIONS AND CLAIM OF PRIORITY

The present application claims priority to U.S. Provisional Patent Application No. 63/115,865 filed on Nov. 19, 2020. The content of the above-identified patent documents is incorporated herein by reference.

TECHNICAL FIELD

The present disclosure relates to electronic devices and methods for user equipment beam codebook design, more particularly, to electronic devices and methods sub-chain beam codebook design.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance.

SUMMARY

Embodiments of the present disclosure provide methods and apparatuses for site-specific and dynamic UE beam codebook designs.

In one embodiment, user equipment (UE) is provided. The UE includes an antenna and a transceiver configured to communicate with a base station (BS) via a wireless communication medium. The UE also includes a processor coupled to the transceiver. The processor is configured to: identify a full-chain beam for a downlink reception based on a beam sweeping; determine a number of activated chains for an uplink transmission; and determine a sub-chain uplink transmission beam.

In yet another embodiment, a method is provided. The method includes identifying a full-chain beam for a downlink reception based on a beam sweeping. The method also includes determining a number of activated chains for an uplink transmission. The method further includes determining a sub-chain uplink transmission beam.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
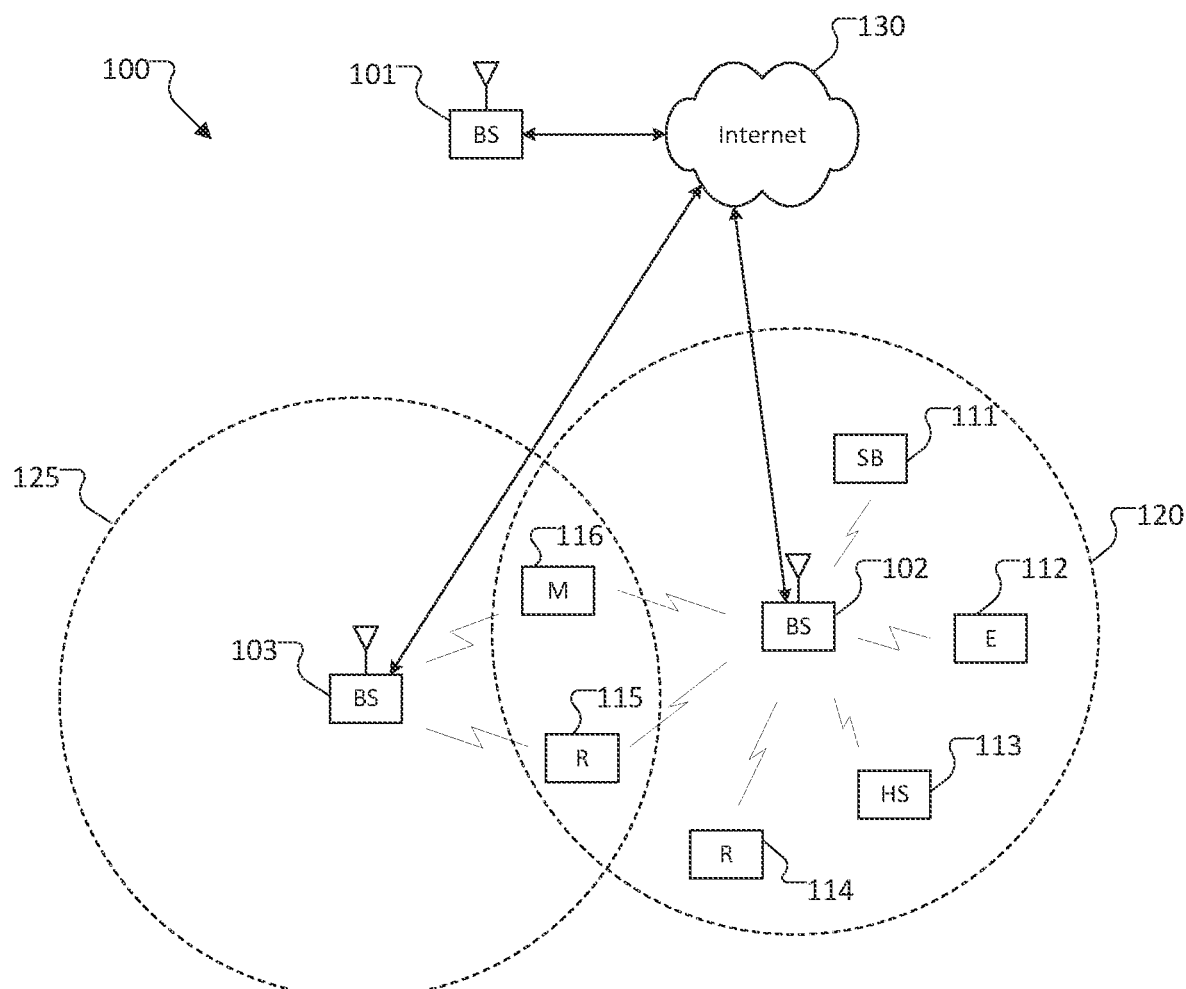
FIG. 1 illustrates an example wireless network according to embodiments of the present disclosure.

FIG. 1 through FIG. 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

To meet the demand for wireless data traffic having increased since deployment of 4G communication systems, and to enable various vertical applications, 5G communication systems have been developed and are currently being deployed. A basic philosophy of New Radio (NR) in $3^{rd}$ Generation Partnership Project (3GPP) is to support beam-specific operations for wireless communication between a gNode B (gNB) and a user equipment (UE). There are several components in the 5G (e.g., fifth generation) NR specification that can efficiently be operated in a beam-specific manner.

The 5G communication system is considered to be implemented to include higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support. Aspects of the present disclosure may be applied to deployment of 5G communication systems, 6G or even later releases which may use THz bands. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the following, for brevity, both Frequency Division Duplexing (FDD) and Time Division Duplexing (TDD) are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another or can operate as standalone schemes.

Figure 2:
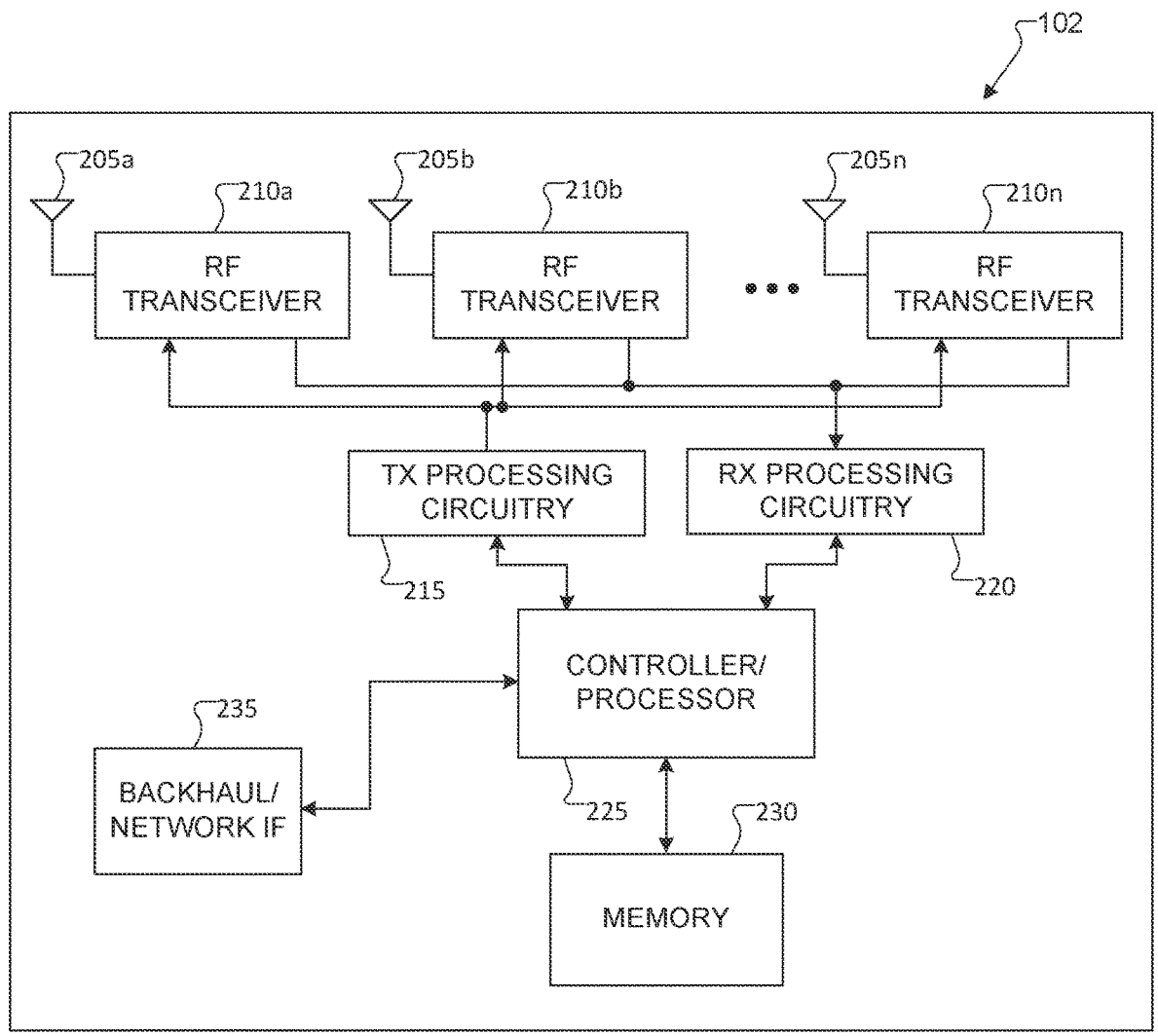
FIG. 2 illustrates an example gNB according to embodiments of the present disclosure.
Figure 3:
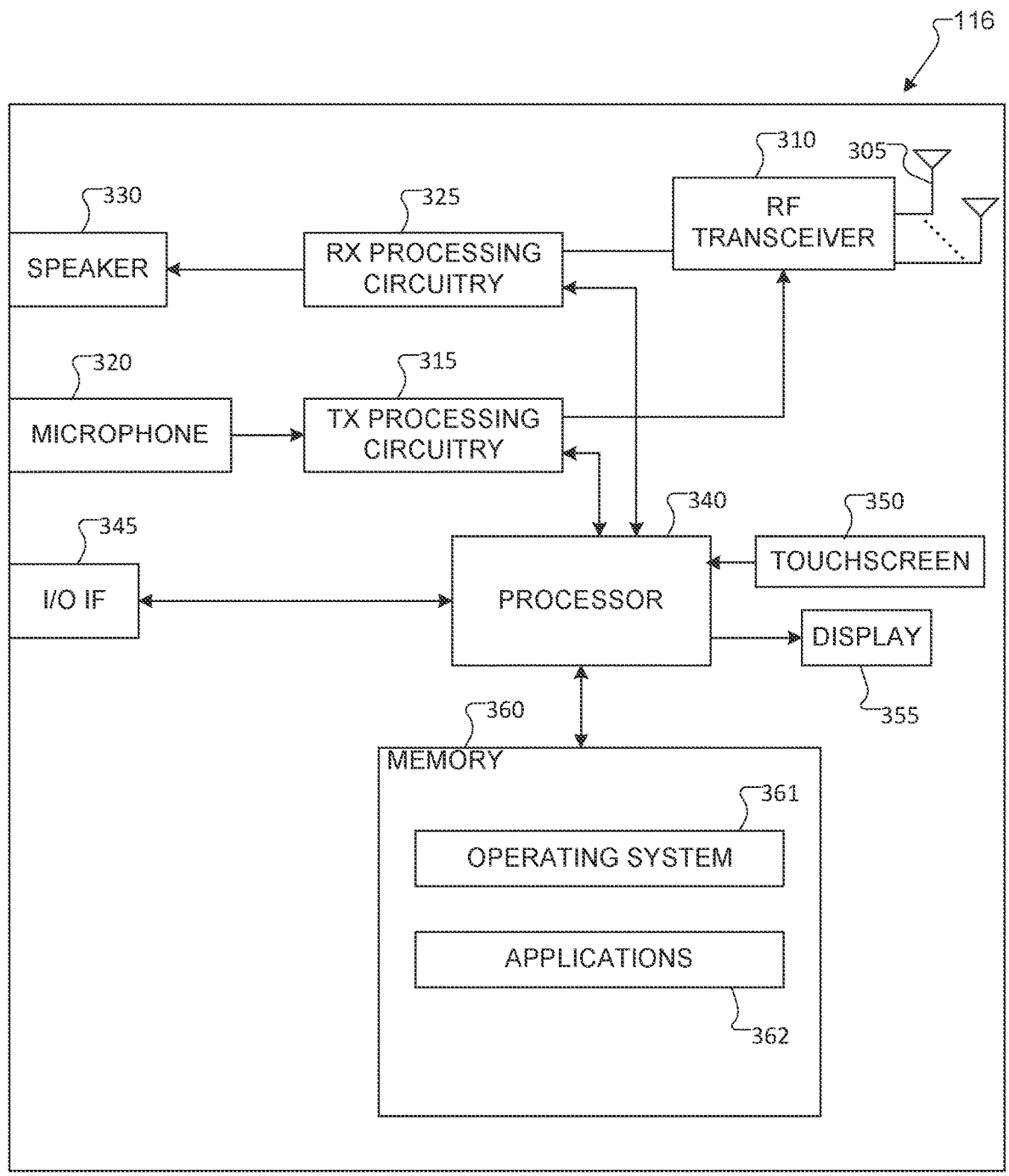
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of gNB 101, gNB 102 and gNB 103 include a two-dimensional (2D) antenna arrays as described in embodiments of the present disclosure. In some embodiments, one or more of gNB 101, gNB 102 and gNB 103 support the codebook design and structure for systems having 2D antenna arrays.

As described in more detail below, one or more of the UEs 111-116 include circuitry, programing, or a combination thereof, for sub-chain beam codebook design and operation. In certain embodiments, and one or more of the gNBs 101-103 includes circuitry, programing, or a combination thereof, to facilitate sub-chain beam codebook design and operation.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. That is, the controller/processor 225 can perform a blind interference sensing (BIS) process, such as performed by a BIS algorithm, and decode the received signal subtracted by the interfering signals. Any of a wide variety of other functions can be supported in the gNB 102 by the controller/processor 225. In some embodiments, the controller/processor 225 includes at least one microprocessor or microcontroller In certain embodiments, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also capable of sub-chain beam codebook design and operation as described in embodiments of the present disclosure. In some embodiments, the controller/processor 225 supports communications between entities, such as web RTC. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM. In certain embodiments, a plurality of instructions, such as a BIS algorithm is stored in memory 230. The plurality of instructions are configured to cause the controller/processor 225 to perform the BIS process and to decode a received signal after subtracting out at least one interfering signal determined by the BIS algorithm.

As described in more detail below, the transmit and receive paths of the gNB 102 (implemented using the RF transceivers 210a-210n, TX processing circuitry 215, and/or RX processing circuitry 220) support sub-chain beam codebook design and operation.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350 (or key pad), a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for UL transmission on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
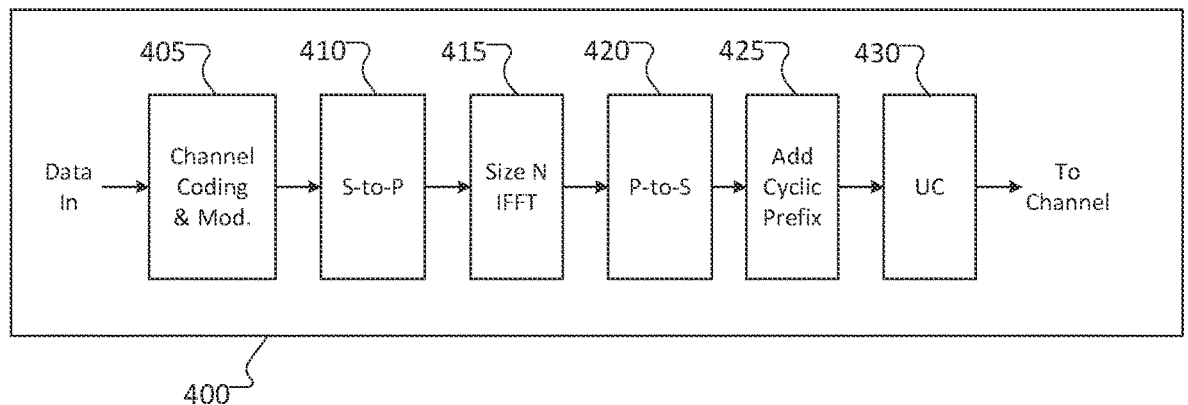
FIG. 4A illustrates a high-level diagram of an orthogonal frequency division multiple access transmit path according to embodiments of the present disclosure.
Figure 4B:
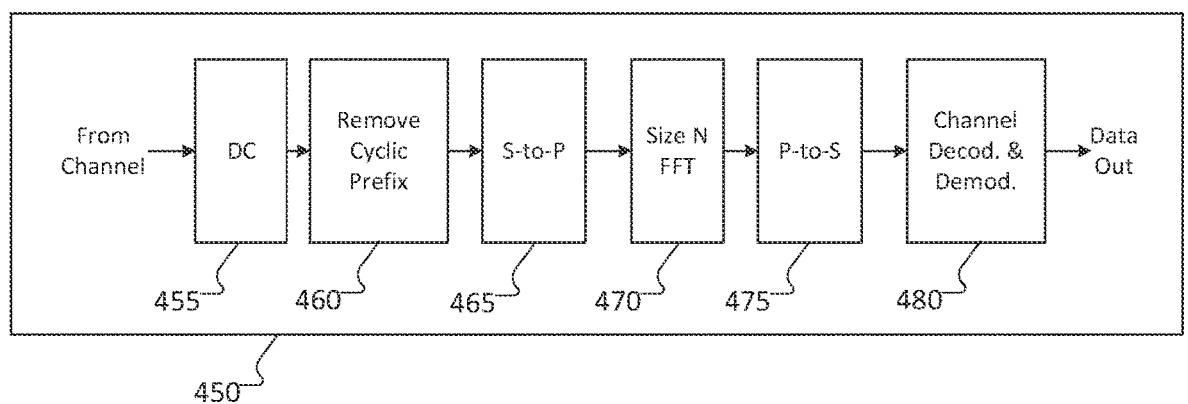
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement (ACK) information in response to data transport block (TB) transmission from a UE in a physical hybrid ARQ indicator channel (PHICH). An eNodeB transmits one or more of multiple types of RS including a UE-common RS (CRS), a channel state information (CSI)-RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct, e.g., acknowledgement (ACK), or incorrect, e.g., negative acknowledgement (NACK), detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$ where $N_{SRS}=1$ if a last subframe symbol is used to transmit SRS and $N_{SRS}=0$ otherwise.

As operating frequency bands in NR become higher, the UE is evolving to accommodate a plurality of antenna panels to enhance aspects of multi-beam operation such as coverage enhancement, beam failure event minimization, fast beam switching, etc. Depending on hardware architectures, each panel on the UE 116 can perform multi-beam operation in a decoupled manner so that it is possible for the UE 116 to be capable of simultaneously DL/UL operations via multiple beam links, each of which corresponds to sufficiently reliable channels to independently communicate with gNB 102. The previous NR specification only allows multiple panels on UE 116 to be used for simultaneous DL reception or single panel selection for UL transmission in TDD operation.

Figure 5:
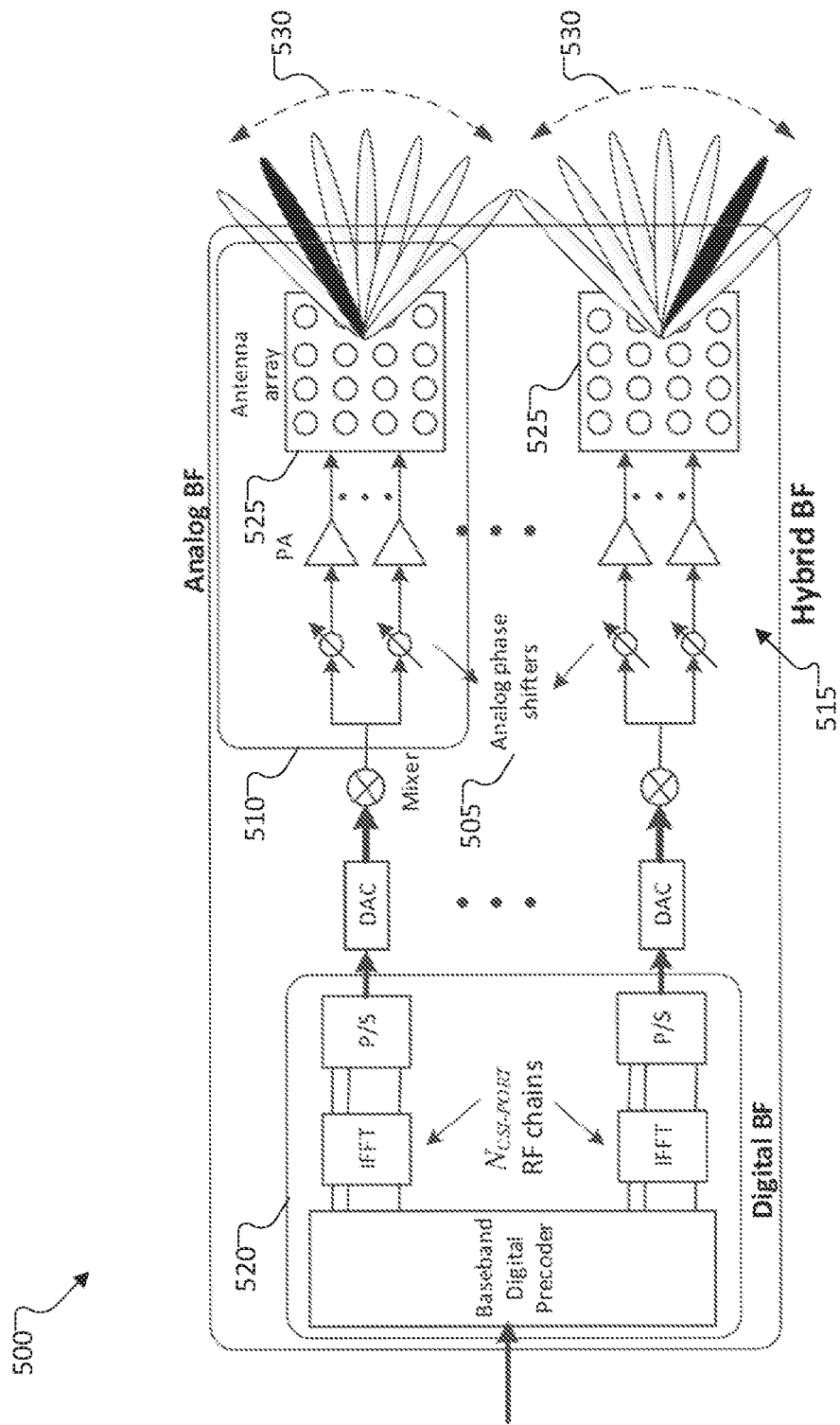
FIG. 5 illustrates an example antenna according to embodiments of the present disclosure.

FIG. 5 illustrates an example antenna blocks 500 according to embodiments of the present disclosure. The embodiment of the antenna 500 illustrated in FIG. 5 is for illustration only. FIG. 5 does not limit the scope of this disclosure to any particular implementation of the antenna 500. In certain embodiments, one or more of gNB 102 or UE 116 include the antenna 500. For example, one or more of antenna 205 and its associated systems or antenna 305 and its associated systems can be configured the same as antenna 500.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies).

In the example shown in FIG. 5, the antenna 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analogy BF 510. The analog beam can be configured to sweep 530 across a wider range of angles by varying the phase shifter bank 505 across symbols or subframes. The number of sub-arrays (equal to the number of RF chains) is the same as the number of CSI-RS ports $N_{CSI-PORT}$. A digital BF 515 performs a linear combination across $N_{CSI-PORT}$ analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the antenna 500 system is also applicable to higher frequency bands such as >52.6 GHz (also termed the FR4). In this case, the system can employ only analog beams. Due to the O2 absorption loss around 60 GHz frequency (~10 decibels (dB) additional loss @ 100 m distance), larger number of and sharper analog beams (hence larger number of radiators in the array) will be needed to compensate for the additional path loss.

An antenna port is defined such that the channel over which a symbol on the antenna port is conveyed can be inferred from the channel over which another symbol on the same antenna port is conveyed. Two antenna ports are said to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

A UE can be configured with a list of up to M transmission configuration indicator (TCI)-State configurations within the higher layer parameter PDSCH-Config to receive PDSCH in a serving cell where M depends on the UE capability maxNumberConfiguredTCIstatesPerCC. Each TCI-State contains parameters for configuring a QCL relationship between one or two downlink reference signals and the DMRS ports of the PDSCH, the DMRS port of a corresponding PDCCH, or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives a MAC-CE activation command to map up to N, such as N=8, TCI states to the codepoints of the DCI field 'Transmission Configuration Indication'. When the HARQ-ACK information corresponding to the PDSCH carrying the MAC-CE activation command is transmitted in slot n, the indicated mapping between TCI states and codepoints of the DCI field 'Transmission Configuration Indication' should be applied after a MAC-CE application time, e.g. starting from the first slot that is after slot $n+3N_{slot}^{subframe,\mu}$ where $N_{slot}^{subframe,\mu}$ is a number of slot per subframe for subcarrier spacing (SCS) configuration $\mu$.

As operating frequency bands in NR become higher, the UE is evolving to accommodate a plurality of antenna arrays 525 or panels (each panel is able to transmit via one analog beam, e.g., analog BF 510) to enhance aspects of multi-beam operation such as coverage enhancement, beam failure event minimization, fast beam switching, and the like. By utilizing the capability of multiple panels, UE 116 is able to obtain a variety of diversity gains, which comes from dynamic selection of panel(s) with the best quality in terms of performance that systems want to optimize. For example, in 3GPP 5G NR Rel-17, new features to facilitate UL beam/panel selection for UEs equipped with multiple panels is being identified and specified under a unified transmission configuration indicator (TCI) framework, in order to mitigate UL coverage loss from several aspects such as maximum permissible exposure (MPE) issues on UE 116.

For example, a beam corresponds to a spatial transmission/reception filter that is used by the UE 116 and/or gNB 102. In one example, a beam can correspond to a spatial reception filter that is used by the UE 116 to receive a reference signal, such as synchronization signals (SS) and physical broadcast channel (PBCH) (SS/PBCH block (SSB)) and/or a CSI-RS and so on. In another example, a beam can correspond to a spatial transmission filter that is used by the UE 116 to transmit a reference signal, such as an UL sounding reference signal (SRS) and so on.

A beam training and measurement procedure can include, for example, a procedure wherein the gNB 102 configures the UE 116 with a set of reference signal (RS) resources, such as SSB resources and/or CSI-RS resources, as well as a configuration for report settings, such that the UE can report beam quality metric(s) measurement(s), such as Reference Signal Received Power (RSRP), Reference Signal Received Quality (RSRQ), Received Signal Strength Indicator (RSSI), Signal to Noise Ratio (SNR), Signal to Interference and Noise Ratio (SINR), and so on, each of which can be, e.g., a L-1 measurement or a filtered L-3 measurement. In one example, a UE 116 and/or a gNB 102 can transmit a reference signal (RS), such as a Synchronization Signal Block (SSB) or a CSI-RS or an SRS with a number of repetitions using a same spatial transmission filter in multiple occasions, so that the gNB 102 and/or UE 116, respectively, can receive the RS with different spatial reception filters, in order to facilitate beam sweeping and identification of a candidate/best beam based on a quality metric, such as L1/L3 RSRP or SINR. In one example, a selection of different spatial reception filters and/or quality metric and/or selection procedure can be per UE/gNB implementation.

A beam indication procedure can include, for example, a procedure wherein the gNB 102 can indicate to the UE 116 to transmit an uplink channel (and/or a second uplink signal) with a same spatial filter that was used to receive a (first) reference signal. In another example, the gNB 102 can indicate to the UE 116 to receive a downlink channel (and/or a second downlink signal) with a same spatial filter that was used to receive a (first) reference signal. Such indication can be, e.g., a DCI and/or MAC-CE, and/or radio resource control (RRC) signaling.

In one example, an antenna panel or, simply a panel, can refer to an antenna array 525 or an antenna sub-array connected to one or multiple RF chains. In one example, a panel can be referred to as a transmission-reception entity (TRE), which can virtualize multiple physical panels into a single virtual panel, based on a transparent UE/gNB implementation, such as MIMO diversity scheme(s).

A gNB 102 could utilize one or multiple transmit beams to cover an entire area of one cell, such as coverage area 120. The gNB 102 can form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may make it feasible for gNB 102 to provide coverage with a single transmit beam; that is, to ensure adequate received signal quality at all UE locations within the coverage area via the usage of a single transmit beam. In other words, at lower transmit signal carrier frequencies, the transmit power amplification provided by the transmit beam with a width large enough to cover the area may be sufficient to overcome the propagation losses to ensure adequate received signal quality at all UE locations within the coverage area. However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the gNB 102 may form a number of transmit beams, each providing coverage over a region narrower than the overall coverage region; but providing the transmit power amplification sufficient to overcome the higher signal propagation loss due to the usage of higher transmit signal carrier frequencies. The UE 116 may also form receive beams to increase the signal-to-interference-and-noise ratio (SINR) at the receiver. Likewise, in the uplink, the UE 116 may form transmit beams and the gNB 102 may form receive beams.

To assist UE 116 in determining a RX and/or TX beam, a beam sweeping procedure is performed. As part of the beam sweeping procedure, gNB 102 transmits a set of transmit beams to sweep the cell area and UE 116 measuring the signal quality on different beams using the UE 116 receive beams. To facilitate candidate beam identification, beam measurement and beam quality reporting, the gNB 102 configures the UE 116 with one or more RS resource corresponding to a set of TX beams. The RS resource can be an SS Block, Periodic/Aperiodic/Semi-Persistent CSI-RS resources, or CRIs. An RS resource refers to a reference signal transmission on a combination of one or more time (OFDM symbol)/frequency (resource element)/spatial (antenna port) domain locations. For each RX beam, the UE 116 reports different TX beams received using that RX beam, ranked in order of signal strength (RSRP) and optionally CSI (CQI/PMI/RI)). Based on the UE 116 measurement report feedback, the gNB 102 indicates to UE 116 with one or more Transmission Configuration Indicator (TCI) states for reception of PDCCH and/or PDSCH.

A 5G terminal or UE can be equipped with multiple antenna elements. There can also be one or more antenna modules fitted on the terminal where each module can have one or more antenna elements. Beamforming is an important factor when UE 116 tries to establish a connection with a BS station, such as gNB 102. To compensate for the narrower analog beamwidth in millimeter-wave (mmWave), analog beams sweeping can be employed to enable wider signal reception or transmission coverage for UE 116. A beam codebook comprises a set of codewords, where a codeword is a set of analog phase shift values, or a set of amplitude plus phase shift values, applied to the antenna elements, in order to form an analog beam. A mmWave beam codebook design is very important and challenging for the 5G mmWave base stations. Different from the low frequency bands, the mmWave antenna is inherently directional and mmWave signal can be very sensitive to blockage, reflection, and the like.

Figure 6:
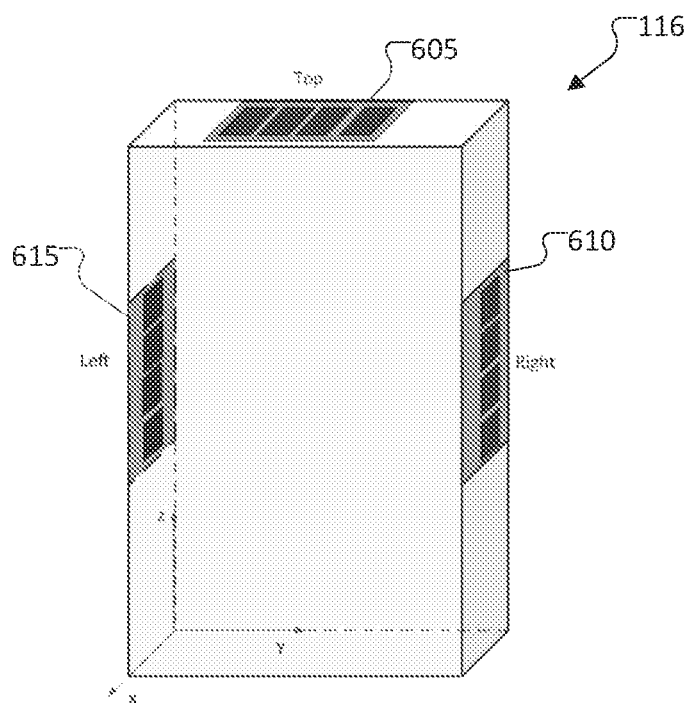
FIG. 6 illustrates an example antenna configuration on a mobile terminal according to embodiments of the present disclosure.

FIG. 6 illustrates an example antenna configuration on a mobile terminal according to embodiments of the present disclosure. The embodiment of the antenna configuration shown in FIG. 6 is for illustration only. Other embodiments could be used without departing from the scope of the present disclosure. In certain embodiments, UE 116 is a 5G terminal.

In certain embodiments, UE 116 includes multiple antenna modules that are disposed on UE 116 to avoid coverage holes on a sphere and increase a robustness of hand and body blockage. In the example shown in FIG. 6, UE 116 includes a top antenna module 605, a right antenna module 610, and a left antenna module 615. Although three antenna modules 605, 610, and 615 are depicted, UE 116 could include more or few antenna modules without departing from the scope of the present disclosure. In certain embodiments, one or more of the antenna modules is on a back surface of UE 116.

Each antenna module can consist of a patch antenna, a dipole antenna array, or both. In the example shown in FIG. 6, each antenna module 605, 610, and 6115 is configured as a 1×4 patch uniform linear array. A large array can increase the beamforming gain to increase the SNR and throughput. The power consumption also increases with the number of active antenna elements. For example, the power consumption of one module 605 could be modelled as:

$$P_{tot}=P_{base}+\gamma_{DL}N_{DL}P_{ant,RX}+\gamma_{UL}N_{UL}P_{ant,TX} \qquad (1)$$

In Equation 1, $P_{tot}$ is the total power consumption, $P_{base}$ is the base power consumption to activate the module, $P_{ant,RX}(P_{ant,TX})$ is the per-antenna power consumption for reception (transmission), $N_{DL}(N_{UL})$ is the number of activated antenna elements for downlink reception or uplink transmission, and $\gamma_{DL},\gamma_{UL}(0\leq\gamma_{DL}+\gamma_{UL}\leq1)$ is the duty cycle for the downlink reception and uplink transmission.

Figure 7:
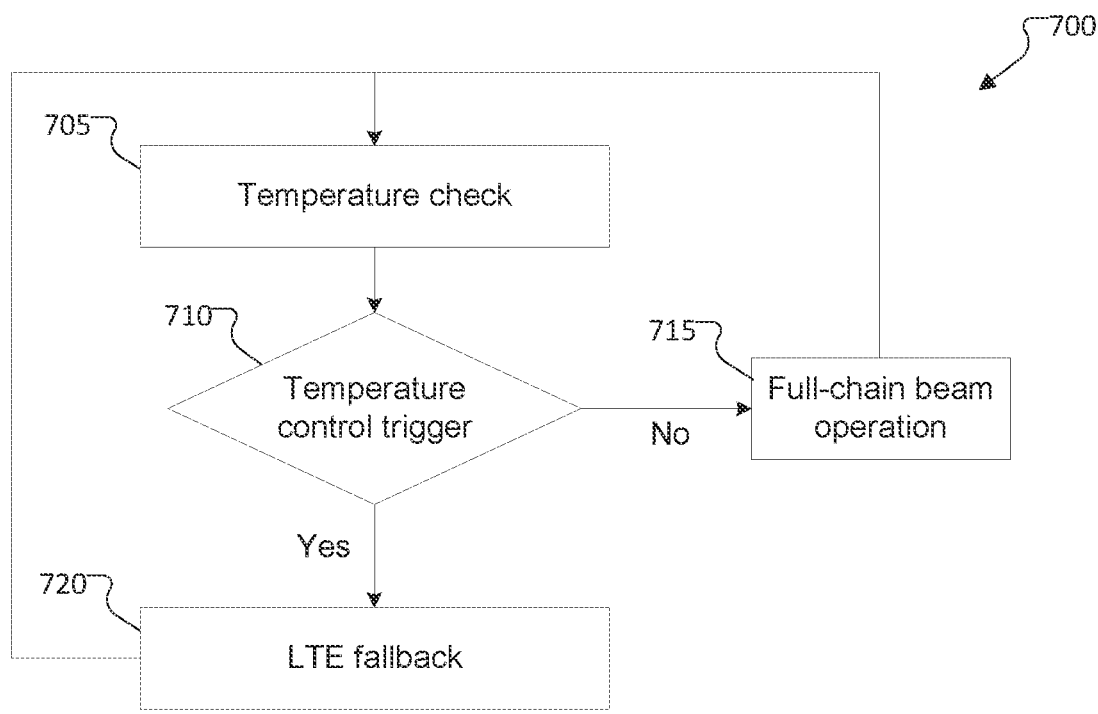
FIG. 7 illustrates an example fallback process for a terminal according to embodiments of the present disclosure.

FIG. 7 illustrates an example fallback process for a terminal in accordance with this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

In certain examples, a UE is configured to perform an LTE fallback whenever the UE is overheating. For example, the UE can perform a temperature check in operation 705. The UE measures a temperature from one or more antenna elements or transceiver in operation 705. In operation 710, the UE determines whether the measured temperature exceeds a temperature control trigger. If the temperature does not exceed the temperature control threshold, the UE maintains full-chain beam operation, in which all antenna elements in an antenna module remain active, in operation 715. If the temperature exceeds the temperature control threshold, the UE transitions to operate according to LTE in the LTE fallback operation in operation 720.

The LTE fallback may not desired in general due to large fallback cost. For example, the maximum data rate decreases from gigabits per second (Gbps) to a few hundred megabits per second (Mbps) or less. The frequent turning off and on of the mmWave antenna module can produce additional latency and power consumption. In certain embodiments, a sub-chain operation can help control the temperature and reduce the chance of LTE fallback.

In certain embodiments, to reduce the power consumption and control a temperature of UE 116, UE 116 can choose to reduce the number of activated antenna elements, that is, $N_{DL}(N_{UL})$. A beam transmitted based on only a part of the array is called 'sub-chain beam'.

Throughout this disclosure, the following notations are used: $N_{ch}(i)$—Number of chains for i-th antenna module;

N$_{UL}$(i)—Number of antenna chains for uplink transmission of i-th antenna module; N$_{DL}$(i)—Number of antenna chains for downlink reception of i-th antenna module; T(i)—Temperature of i-th antenna module; γ$_{UL}$(i)—Duty cycle for uplink transmission of i-th antenna module; γ$_{DL}$(i)—Duty cycle for downlink reception of i-th antenna module; K(i)—Codebook size of i-th antenna module; and G(θ, φ) The beam radiation pattern over the unit-sphere {(θ,φ) |0°≤θ≤180°, 0°≤φ≤360°}.

Figure 8:
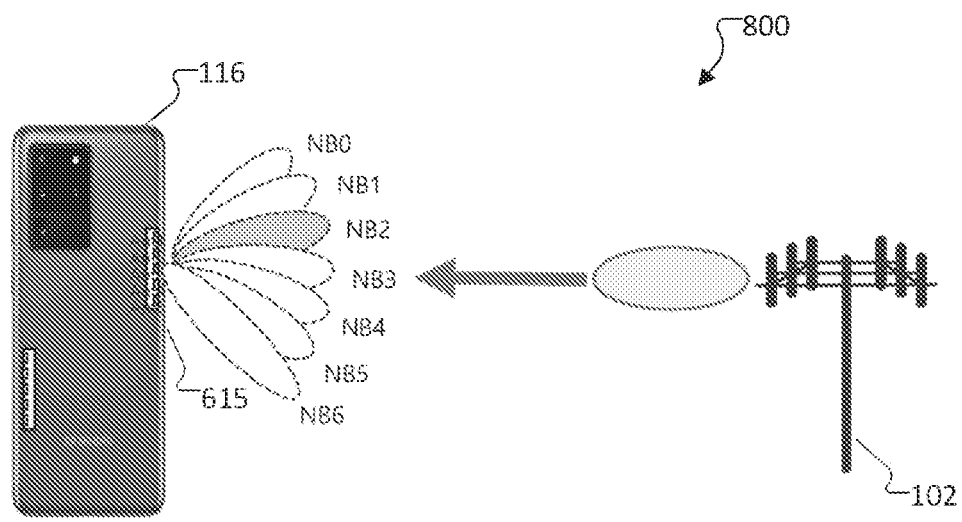
FIGS. 8 and 9 illustrate examples of downlink-uplink correspondence with differing number of chains according to embodiments of the present disclosure.
Figure 9:
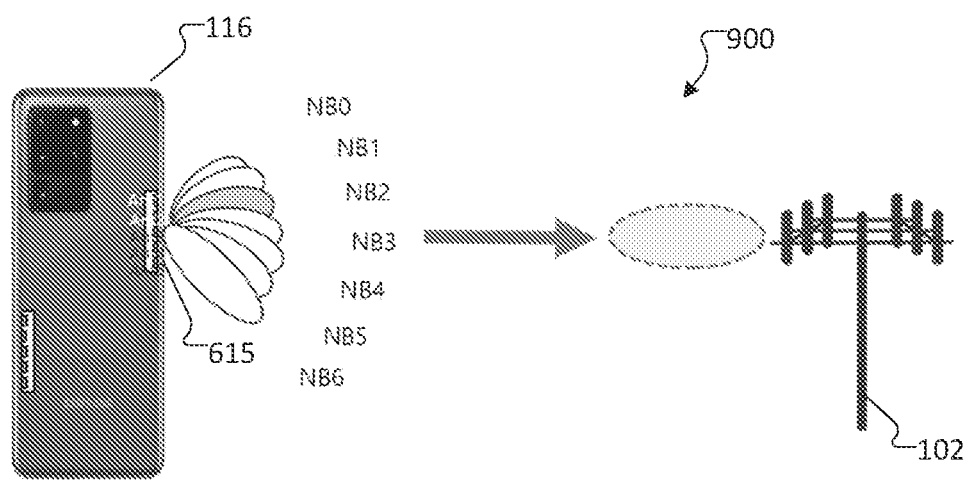

FIGS. 8 and 9 illustrate examples of downlink-uplink correspondence with differing number of chains according to embodiments of the present disclosure. The embodiments of the examples illustrated in FIGS. 8 and 9 are for illustration only, and other embodiments could be used without departing from the scope of the present disclosure.

In the example shown in FIG. 8, a downlink transmission 800 is depicted. The UE 116 includes an antenna module 615 having seven antenna chains, NB0-NB6. UE 116 can perform a beam-sweeping operation to receive the downlink transmission 800 from gNB 102. In the beam-sweeping operation, UE 116 detects and receives the downlink transmission 800 via the third antenna chain, NB2.

In the example shown in FIG. 9, an uplink transmission 900 is depicted. After receiving the downlink transmission, UE 116 transmits the uplink transmission 900 using all or a sub-set of its antenna elements. As a first example, UE 116 activates all the antenna elements such that the number of chains for DL reception equals the number of chains for the UE 116 to maintain channel reciprocity. As another example, UE 116 may have 3 antenna elements activated such that the number of chains for the downlink reception is greater than the number of chains for the uplink transmission 900. The UE 116 can transmit on the UL using a sub-chain beam to save the uplink transmission power of the UE 116 and to control the temperature of the UE 116. Since the downlink transmission 800 via the third antenna chain, NB2, UE 116 activates includes an antenna module 615 having seven antenna chains, NB0-NB6. UE 116 can perform a beam-sweeping operation to receive the downlink transmission 800 from gNB 102. In the beam-sweeping operation, UE 116 detects and receives the downlink transmission 800 via the third antenna chain, NB2 as the best receive beam via all antenna chains, then NB2 should be the best transmit beams, even among three transmit chains, such as NB1-NB3. DL-UL beam correspondence is an important design criterion, since an additional separate UL beam management procedure will be required if there is no DL-UL beam correspondence.

In certain embodiments, UE 116 is configured to select a sub-chain beam codebook from multiple sub-chain beam codebooks, the selection based on at least one of: an inter-chain beam correspondence requirement; temperature; power savings; signal strength/quality; maximum permissible exposure (MPE); or precoding matrix index (PMI) feedback.

Sub-Chain Beam Codebook Design

Figure 10:
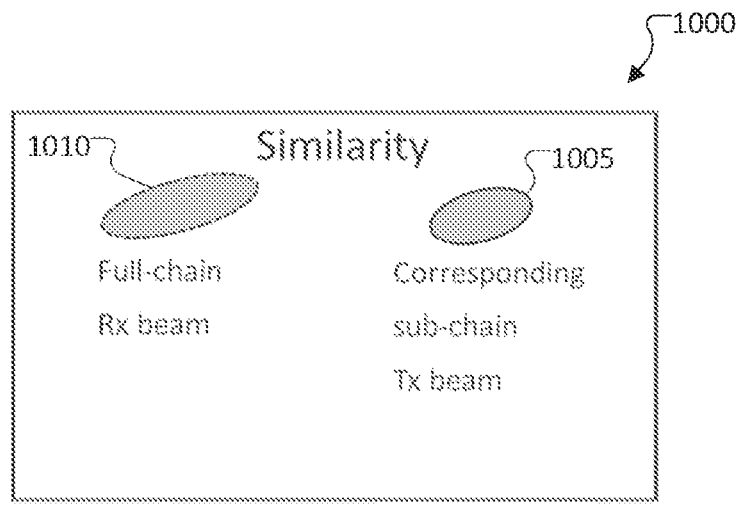
FIGS. 10, 11, and 12 illustrate design metrics according to embodiments of the present disclosure.
Figure 11:
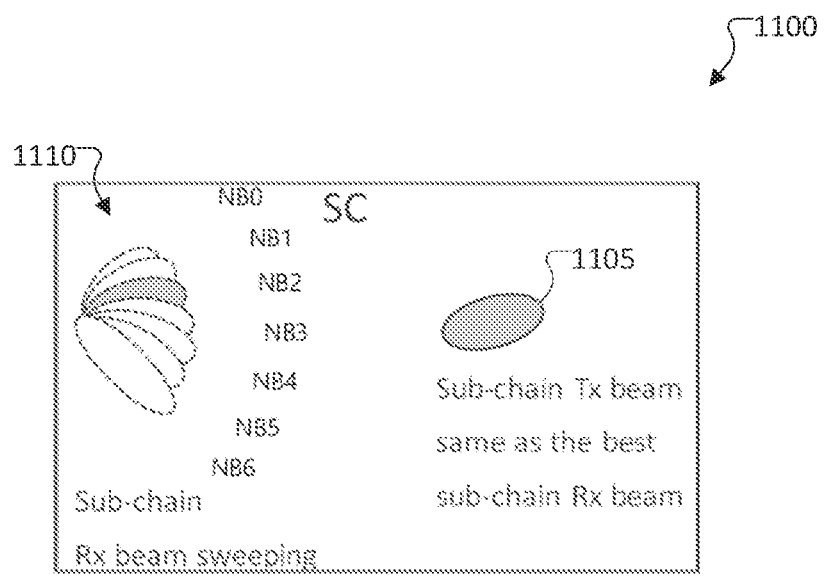
Figure 12:
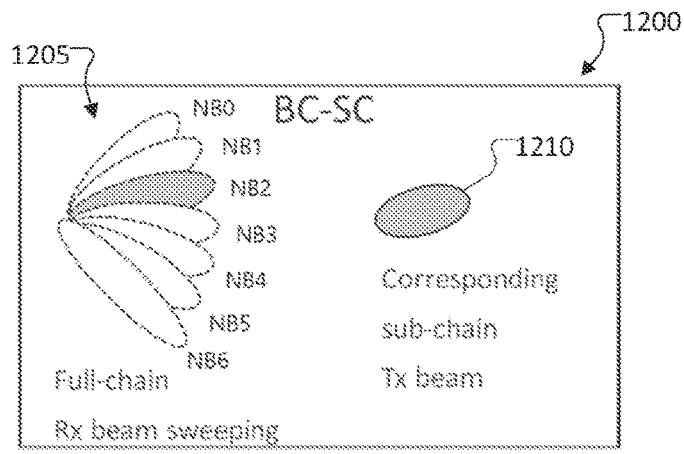

FIGS. 10-12 illustrate design metrics in according to embodiments of the present disclosure. The embodiments of the design metrics shown in FIGS. 10-12 are for illustration only, and other embodiments could be used without departing from the present disclosure.

The UE 116 includes a sub-chain beam codebooks that can be designed based on three different metrics per different requirements and UE operation procedures. The three different metrics are: 'similarity score' 1000, 'spherical coverage (SC)' 1100, and 'beam correspondence spherical coverage (BC-SC)' 1200.

In the first option of 'similarity score' 1000, the sub-chain beams 1005 are designed to resemble the full-chain beams 1010. That is, the radiation pattern of each sub-chain beam is designed to be similar to that of the corresponding full-chain beam (one-to-one mapping). There could be different measures of similarity of two beam patterns. In one approach, assuming that there are uniform sampling points (θ, φ) on the unit-sphere, the similarity score is defined according to:

$$s_i = \frac{1}{\sum_{(\theta,\phi)} G_i^2(\theta, \phi)} \sum_{(\theta,\phi)} G_i(\theta, \phi) B(\theta, \phi) \quad (2)$$

In Equation 2, $G_i(\theta, \phi)$ is the radiation pattern of i-th full-chain beam, and $B(\theta, \phi)$ is the radiation pattern of a sub-chain beam. The term $\Sigma_{(\theta,\phi)} G_i^2(\theta, \phi)$ is used to normalize the score, such that $0 \le s_i \le 1$, and the similarity score between a beam and itself is one.

In the second option of 'spherical coverage' 1100, the sub-chain codebook is designed to maximize the spherical coverage. There is no requirement regarding the one-to-one mapping between the sub-chain beam 1105 and full-chain beams 1110, which implies that a fresh beam sweeping may be needed to determine the best beam if UE 116 switches from full-chain to sub-chain codebook (or switches between two sub-chain codebooks). There are different ways to design codebooks for spherical coverage maximization. Examples of the different ways to design codebooks include the Greedy algorithm and K-Means algorithm given in Jianhua Mo, Boon Loong Ng, Sanghyun Chang, Pengda Huang, Mandar N. Kulkarni, Ahmad AlAmmouri, Jianzhong Charlie Zhang, Jeongheum Lee and Won-Joon Choi, "Beam Codebook Design for 5G mmWave Terminals", IEEE Access, July 2019, which is incorporated by reference herein.

In the third option of 'beam correspondence spherical coverage' 1200, the sub-chain beams are designed to maximize the radiation pattern over the full-chain beam's coverage region, which is a sub-region of the whole unit-sphere. A fresh beam sweeping is not necessary in this option since the sub-chain beam is designed to cover an angular region similar to the full-chain beam. Therefore, for a given channel, the sub-chain beam is very likely to be the best one if the corresponding full-chain beam is the best. The procedure is as follows.

1) Partition the unit-sphere (0°≤θ≤180°, 0°≤φ≤360°) (or the required angular coverage region for the current module) into the coverage region of the full-chain beams 1205. For example, if there are K beams, we have $D_1 \cup D_2 \cup \ldots D_{K-1} \cup D_K = \{(\theta,\phi)|0°\le\theta\le180°, 0°\le\phi\le360°\}$ where $D_k$ is the angular region covered by the full-chain beam k.

2) For each angular region covered by the full-chain beam 1205, find the best sub-chain beam 1210.

In certain embodiments, in the codebook design, all the possible combinations of chains are exhaustively searched. For example, when designing a 3-chain beam for the 1×5 array, there are $$\binom{5}{3} = 10$$

possible combinations. For each combination, the beamforming weights are optimized. For example, if the 1st, 2nd, 4th chain are activated, optimize the beamforming weights w=[$w_1$, $w_2$, 0, $w_4$, 0,] to maximize the design metric. When the array size is not too big, the complexity of the exhaustive search is affordable.

An example codebook for the case of 5-element module is given in TABLE 1. All the 5 antennas are activated for the full-chain beam, while for the 3-chain beam, only 3 out of 5 elements are activated, i.e., having nonzero beamforming weights. Similarly, only two antennas are activated for the 2-chain beam case. In this table, the inter-chain beam correspondence is assumed. For example, if the $1^{st}$ full chain beam [1 j −1 −j 1] is adopted now and UE decides to switch to 3-chain operation for power saving, UE may apply the $1^{st}$ 3-sub beam [j −1 −j 0 0] directly without a fresh beam sweeping.

TABLE 1

The sub-chain beam codebooks for a 1 × 5 array with 2-bit phase shifters. Note that the inter-chain beam correspondence is assumed for each row.

| Beam index | Full-chain beam | 3-chain beam | 2-chain beam |
| --- | --- | --- | --- |
| 1 | [1 j −1 −j 1] | [j −1 −j 0 0] | [1 j 0 0 0] |
| 2 | [1 −1 1 −1 1] | [0 −1 −1 1 0] | [0 −1 1 0 0] |
| 3 | [1 −j −1 j 1] | [1 −j 0 j 0] | [1 0 0 j 0] |
| 4 | [1 1 1 1 1] | [0 −1 −1 −1 0] | [0 1 1 0 0] |

Selection Among the Three Different Design Metrics

Figure 13:
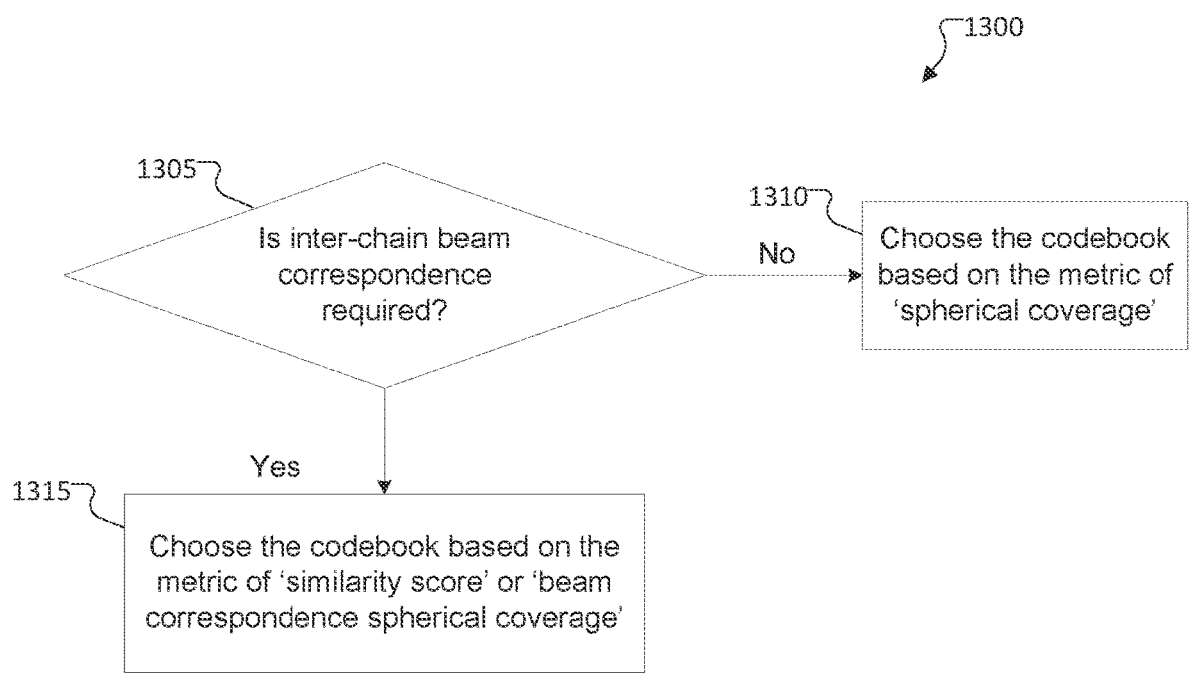
FIG. 13 illustrates an example process for codebook selection based on the inter-chain beam correspondence in accordance with the present disclosure.

FIG. 13 illustrates an example process for codebook selection based on the inter-chain beam correspondence in accordance with this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

In certain embodiments, UE 116 can have at least two sub-chain codebooks, which can be designed or generated offline. The UE 116 can choose to apply one of them in real time according to the operation requirement. In certain embodiments, the selection of the sub-chain codebooks depends on the requirement of inter-chain beam correspondence. In operation 1305, a determination is made if inter-chain beam correspondence is required. In operation 1310, the codebook that does not have the property of inter-chain beam correspondence (e.g., can be based on the 'spherical coverage' metric described previously) can be selected if the inter-chain beam correspondence is not required. In certain examples, the UE 116 operates with a certain number of chains and wants to change to number of chains due to temperature control, power saving, and the like. If UE 116 performs a fresh beam sweeping to determine the best sub-chain beam after changing the number of chains, the UE 116 can determine that codebook based on the 'spherical coverage' metric may be the most suitable one. Otherwise, in operation 1315, if the inter-chain beam correspondence is required, the UE 116 can select another codebook that has the property of inter-chain beam correspondence, that is, it can be either a codebook designed/generated for the 'similarity score' or the BC-SC metric.

Figure 14:
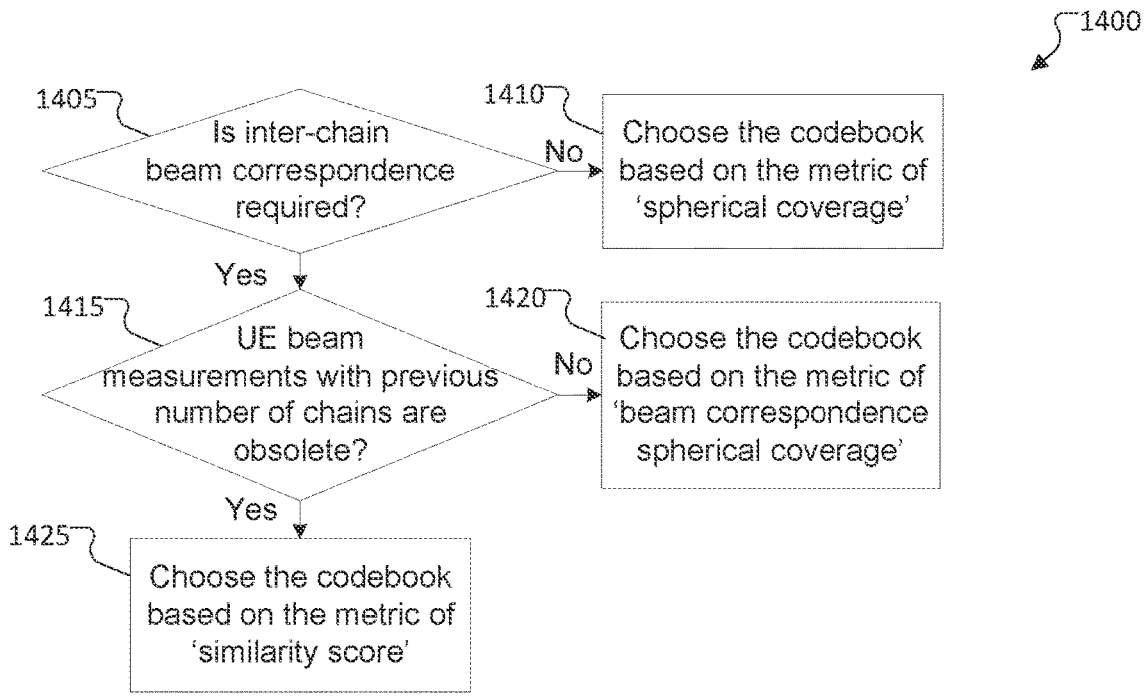
FIG. 14 illustrates an example process for codebook selection based on the inter-chain beam correspondence and beam measurements in accordance with the present disclosure.

FIG. 14 illustrates an example process for codebook selection based on the inter-chain beam correspondence and beam measurements in accordance with this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

In operation 1405, a determination is made if inter-chain beam correspondence is required. If inter-chain beam correspondence is required, the UE 116 chooses the codebook based on the metric of 'spherical coverage' in operation 1410. Otherwise, the other two codebooks could be selected. First, in operation 1415, a determination is made whether UE beam measurements with previous number or chains is obsolete. If, in operation 1415, it is determined that the UE beam measurements with the previous codebook is not yet obsolete or stale or unreliable, the UE chooses the codebook based on the metric of 'beam correspondence spherical coverage' in operation 1420. That is, if UE 116 does a beam sweeping before changing the number of chains, UE 116 can roughly estimate the angle of arrival (AoA) as an angle within the coverage region of the current best beam, and should choose a beam maximizing the beamforming gain over that angular region. Therefore, the codebook based on the metric BC-SC is the most suitable one. Note that the design procedure of BC-SC actually assumes a beam sweeping before changing the number of chains implicitly. Last, if in operation 1415, it is determined that the UE beam measurements with the previous codebook is obsolete/reliable or may have become obsolete/reliable, the UE 116 chooses the codebook based on the metric of 'similarity score'. That is, because the UE does not sweep beams either before or after changing the number of chains, or because of a recent UE rotation, or a hand blockage during the beam sweeping cycle), the selected best beam based on the measurements may not the actual best one, UE can choose the metric 'similarity score' in operation 1425, which maintains the similarity between the previous beam and the new beam as much as possible. Note that the there is no guarantee that the beam is the best one since there is neither beam sweeping before the number of chains changes nor after. To determine if the beam measurements are obsolete, UE could set a timer, which is reset after each measurement and indicates the measurement is outdated when the times counts down to zero. The sensors on the phone could detect the rotation and the nearby blockage and could declare the measurements are unreliable if a fast rotation happens or a hand blockage is detected within a measurement cycle.

Figure 15:
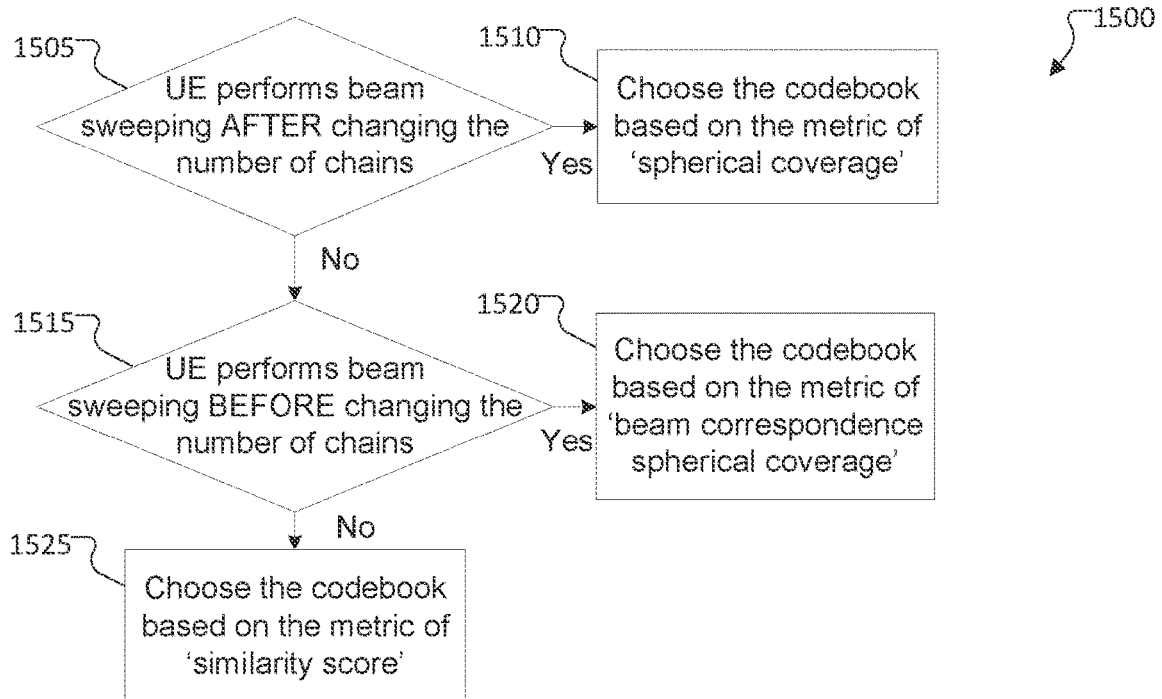
FIG. 15 illustrates an example process for codebook selection based on a terminal beam sweeping timing in accordance with the present disclosure.

FIG. 15 illustrates an example process for codebook selection based on a terminal beam sweeping timing in accordance with this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 1500 depicted in the example depicted is implemented by a transmitter chain in, for example, a mobile station.

In certain embodiments, the sub-chain beam codebook selection is determined by the timing of UE beam sweeping with respect to the change of the number of chains. In operation 1505, if UE 116 performs a fresh beam sweeping to determine the best sub-chain beam after changing the number of chains, the codebook based on the 'spherical coverage' metric is selected as the most suitable codebook in operation 1510. Otherwise, in operation 1515, if UE 116 performs a beam sweeping before changing the number of chains, the codebook based on the BC-SC metric is selected as the codebook in operation 1520. Otherwise, if UE 116 does not perform sweeping according to either operations 1505 or 1515, in operation 1525, the codebook based on the 'similarity score' metric is selected.

The Beam Correspondence Evaluation for the Sub-Chain Beam Operation

A current requirement in 3GPP only considers the full-chain case and does not apply well to the sub-chain cases. Therefore, in certain embodiments, a scheme "beam correspondence tolerance" is borrowed from 3GPP (TR38.101-2, Section 6.6.4.2) to evaluate the beam correspondence for sub-chain codebook. The scheme compares the gap of two EIRPs in the angular region where the pure UE beam sweeping results in above-median EIRP. The scheme currently only applies to the case when "beamCorrespondenceWithoutUL-BeamSweeping" is not present, which means that there is a separate UL beam management procedure.

The procedure of the evaluation scheme is as follows.

1) $EIRP_1$: total EIRP in dBm calculated based on the beam the UE chooses autonomously based on DL beam sweeping (it is called "beam correspondence spherical coverage" in our notation)

2) $EIRP_2$: the best total EIRP relying on UL beam sweeping (i.e., "spherical coverage")

3) Check the angle region that corresponds to the top 50% percentile of the $EIRP_2$ (i.e., it is only half sphere area). Other percentile point can also be chosen depending on design criterion.

4) Calculate the $\Delta EIRP_{BC} = EIRP_2 - EIRP_1$

5) Check $\Delta EIRP_{BC}$ at a certain percentile (e.g., 85%-tile, 90%-tile, 95%-tile, or other, depending on the design requirement). If it is less than a certain threshold (e.g., 1 dB, 3 dB, or other value depending on the design requirement), then the requirement is fulfilled.

Sub-Chain Beam Operation

Basic UE Procedure for Determining DL/UL beam Operation Scheme

In certain embodiments, UE 116 can choose to either use the same number of chains during the reception and transmission or not. The scheme of $N_{UL}=N_{DL}$ limits the choice of UE operation; but maintains the beam correspondence and thus channel reciprocity. The scheme of $N_{UL} \neq N_{DL}$ is more flexible for UE to adjust the chains according to the power usage, temperature, battery level, channel strength/quality, and so forth.

In certain embodiments, UE 116 uses sub chains for transmission but full chains for the reception, i.e., $N_{UL} \leq N_{DL} = N_{ch}$. Since the transmission is more power hungry than the reception, UE 116 can save more power and reduce the temperature efficiently by adopting the sub-chain for transmission than reception. Alternatively, the full-chain Rx operation facilitates the downlink reception at UE 116.

PMI Feedback

Figure 16:
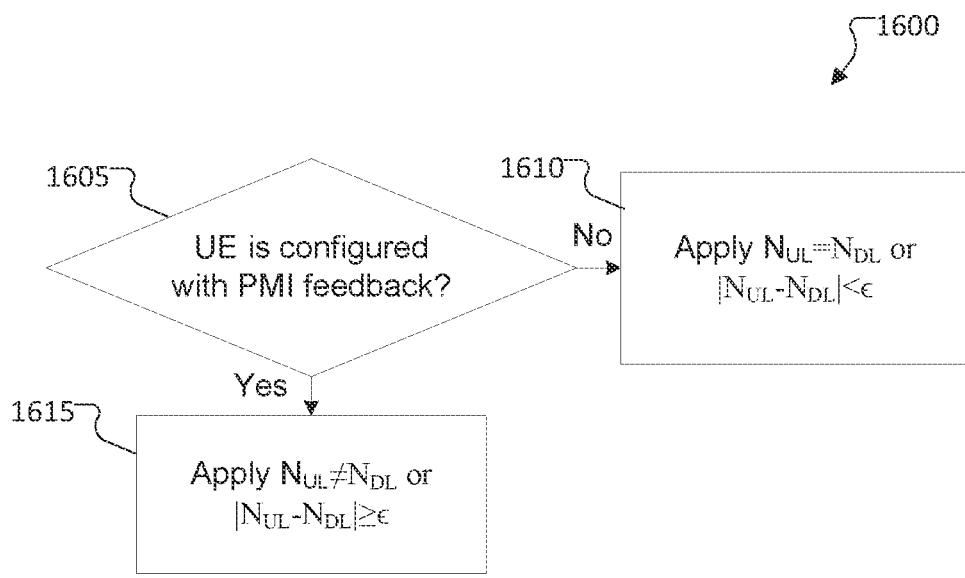
FIG. 16 illustrates an example process for Scheme selection based on the configuration of a precoding matrix index feedback in accordance with the present disclosure.

FIG. 16 illustrates an example process for Scheme selection based on the configuration of a precoding matrix index PMI feedback in accordance with this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 1600 depicted in the example depicted is implemented by a transmitter chain in, for example, a mobile station.

In operation 1605, UE 116 checks the configuration of PMI (precoding matrix index) feedback to decide the sub-chain operation scheme. If UE 116 is not configured with PMI feedback, in operation 1610, gNB 102 measures the uplink channel by itself and determines the downlink precoding assuming channel reciprocity. In this case, UE 116 should apply same number of chains for DL and UL (i.e., $N_{UL}=N_{DL}$) or similar number of chains (i.e., $|N_{UL}-N_{DL}|<\epsilon$), such that the DU and UL beam is same or sufficiently similar. If UE 116 is configured with PMI feedback, in operation 1615, UE 116 measures the downlink channel, and determines the PMI and feedbacks the PMI to gNB 102. Therefore, the beam correspondence between the Tx and Rx beams of UE 116 is not required, and UE 116 can set chains flexibly, for example, $N_{UL} \neq N_{DL}$ or $|N_{UL}-N_{DL}| \geq \epsilon$. For 3GPP 5G NR, if UE 116 is configured with a CSI-ReportConfig with the higher layer parameter reportQuantity set to 'cri-RI-PMI-CQI', or 'cri-RI-LI-PMI-CQI', UE 116 is considered to be configured with PMI feedback; otherwise the UE is not configured with PMI feedback.

Temperature Control

Figure 17:
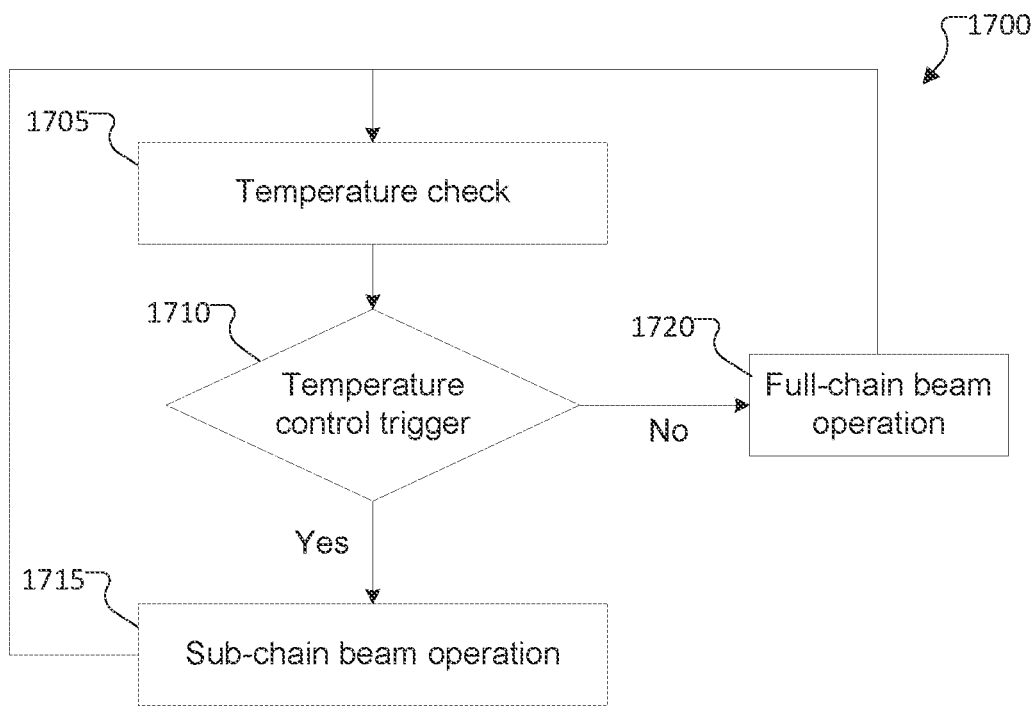
FIG. 17 illustrates an example process for sub-chain/full-chain operation dependent on the temperature in accordance with the present disclosure.

FIG. 17 illustrates an example process for sub-chain/full-chain operation dependent on the temperature in accordance with this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 1700 depicted in the example depicted is implemented by a transmitter chain in, for example, a mobile station.

In operation 1705, UE 116 checks the temperature to determine if sub-chain should be applied. UE 116 can check the temperature periodically. In operation 1710, UE 116 determines whether a temperature control trigger has been triggered. If the temperature control is triggered, in operation 1715, UE 116 adopts the sub-chain beam operation. Otherwise, UE 116 adopts the full-chain beam operation in operation 1720.

Figure 18:
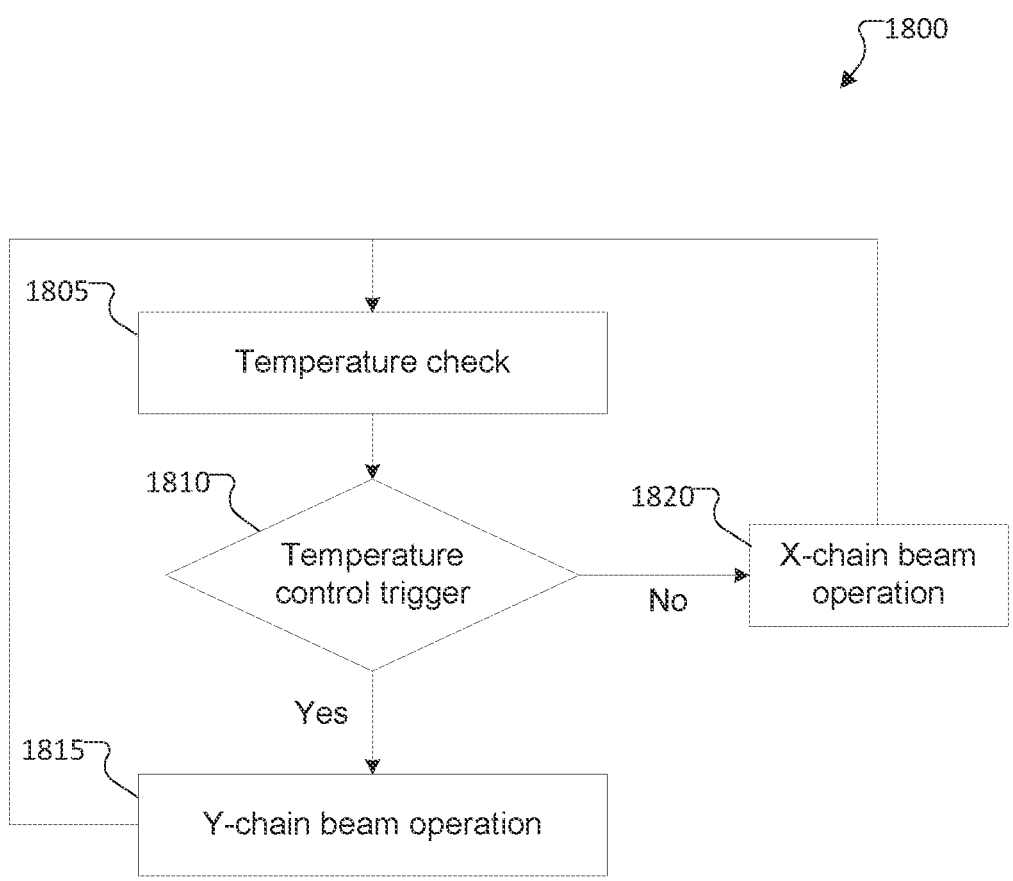
FIG. 18 illustrates an example process for sub-chain operation according to temperature in accordance with the present disclosure.

FIG. 18 illustrates an example process for sub-chain operation according to temperature in accordance with this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 1800 depicted in the example depicted is implemented by a transmitter chain in, for example, a mobile station.

In certain embodiments, UE 116 is configured to reduce the number of chains as the temperature increases. For example, for an antenna model with 4-chains, UE 116 can rely on a list of temperature in an increasing order, $T_1<T_2<T_3<T_4$. In the example shown in FIG. 18, in operation 1805, UE 116 checks the temperature to determine if sub-chain should be applied. UE 116 can check the temperature periodically. In operation 1810, UE 116 determines whether a temperature control trigger has been triggered. If the temperature control is triggered, in operation 1815, UE 116 adopts a Y-chain beam. Otherwise, UE 116 maintains the X-chain operation in operation 1820. In process 1800, Y is less than X. After each of operations 1815 and 1820, UE 116 again checks the temperature in operation 1805 and determines whether a temperature control has been triggered in operation 1810. If no trigger occurs, the UE maintains the currently sent chain beam; but if a trigger occurs, UE 116 reduces the a lower sub-beam chain. For example, when the temperature is below $T_1$, UE 116 sets $N_{UL}=N_{DL}=4$; when the temperature is between $T_1$ and $T_2$, UE 116 sets $N_{UL}=N_{DL}=3$; when the temperature is between $T_2$ and $T_3$, UE 116 sets $N_{UL}=N_{DL}=2$; when the temperature is between $T_3$ and $T_4$, UE sets $N_{UL}=N_{DL}=1$; and if the temperature is above $T_4$, UE 116 turns off the whole antenna module. UE 116 could try other antenna modules that are not as overheated as the current one, or choose to fallback to sub-6 GHz LTE or sub-6 GHz 5G connection or other connectivity technology that can help mitigate overheating.

In certain embodiments, UE 116 may not use the same number of chains for DL and UL as the temperature changes. In first option, UE 116 first reduces $N_{UL}$ to the minimum, and then reduces $N_{DL}$ since transmission usually consumes more power than reception. For example, if there are five chains, UE 116 can set $[N_{DL}, N_{UL}]=[5\ 5] \rightarrow [5\ 4] \rightarrow [5\ 3] \rightarrow [5\ 2] \rightarrow [5\ 1] \rightarrow [4\ 1] \rightarrow [3\ 1] \rightarrow [2\ 1] \rightarrow [1\ 1]$ as the temperature increase. In the second option, UE 116 iteratively reduces $N_{UL}$ and $N_{DL}$. For example, $[N_{DL}, N_{UL}]=[5\ 5] \rightarrow [5\ 4] \rightarrow [4\ 4] \rightarrow [4\ 3] \rightarrow [3\ 3] \rightarrow [3\ 2] \rightarrow [2\ 2] \rightarrow [2\ 1] \rightarrow [1\ 1]$. In this case, $N_{DL}$ is either equal to $N_{UL}$ or larger than $N_{UL}$ by one, such that the beam correspondence is maintained with high chance. In the third option, UE 116 reduces the number of chains according to the power consumption. UE 116 first sorts the pair $[N_{DL}\ N_{UL}]$ in a decreasing order of power consumption and then deactivates the downlink/uplink chains by following the order. Note that if there is a minimum number of chains required to maintain the connection with BS, the above ordered list can be changed accordingly. For example, in the first option, the revised list could be $[N_{DL}, N_{UL}]=[5\ 5] \rightarrow [5\ 4] \rightarrow [5\ 3] \rightarrow [4\ 3] \rightarrow [3\ 3]$, if 3-chain beam is needed to maintain the connection to gNB 102.

Signal Strength/Quality

In certain embodiments, UE 116 determines the number of chains based on the signal strength/quality. If the signal strength/quality is above a threshold or sufficient to support the required data rate, UE 116 can activate less number of chains. The signal strength/quality can be decided from RSRP/RSRQ/SNR/SINR, and so forth. If the signal strength/quality drops below the threshold or insufficient to support the required data rate, UE 116 activates more and more chains until the signal strength/quality is above the threshold or the data rate requirement is met.

Battery Level

In certain embodiments, UE 116 determines the number of chains based on the battery level. If the battery level is below a threshold (for example, 20%), UE 116 can activate a smaller number of chains, especially the chains for uplink transmission, to extend battery life.

Maximum Permissible Exposure

Maximum permissible exposure (MPE) is the maximum level of electromagnetic radiation to which a person may be exposed without hazardous effects to the eye or skin. In certain embodiments, if the full-chain beam transmission exceeds the maximum permissible limit, UE 116 can adopt a sub-chain beam for the transmission. The number of chains can be determined based on the radiation power of the antenna module, the distance to an eye or skin of the human operator of UE 116, and the MPE requirements determined by regulators, for example, FCC. The higher the transmission power and the closer the human eye or skin to the antenna module, the less the number of chains that should be used for the transmission.

Upper Layer Requirement

In certain embodiments, UE 116 determines the number of chains based on the requirement of the upper layer requirement. If the upper layer has strict requirement on the data rate or latency, for example, UE 116 is steaming, or displaying, a live video, the full-chain beams could be used. If there is no strict constraint on the data rate or latency, for example, UE 116 is in idle mode or just browsing the Internet, a smaller number of chains can be activated.

Figure 19:
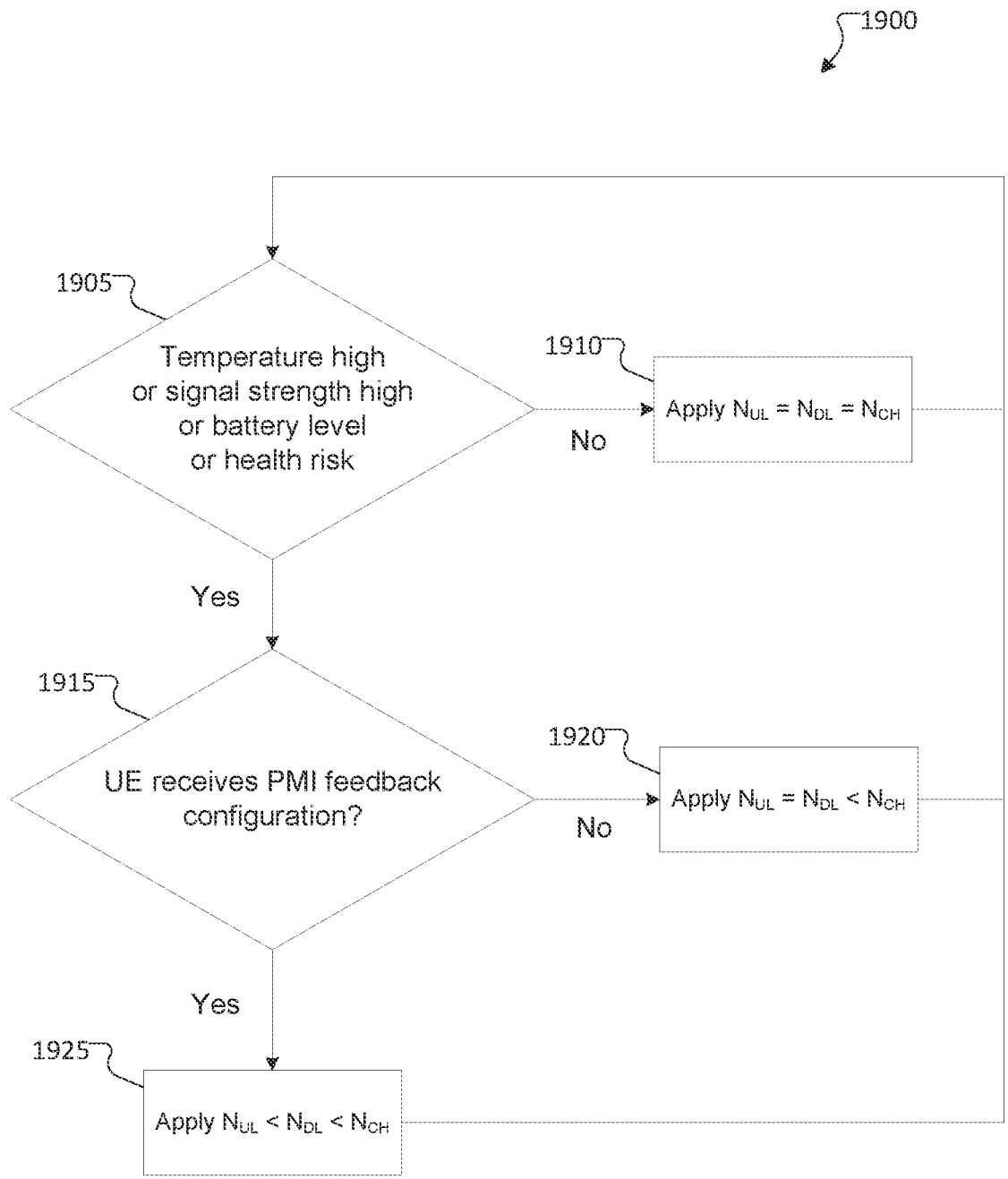
FIG. 19 illustrates an example process for sub-chain operation based on various factors in accordance with the present disclosure.

Joint Consideration of Temperature Control, PMI Feedback, the Signal Strength, Battery Level, MPE, and Other Factors FIG. 19 illustrates an example process for sub-chain operation based on various factors in accordance with this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 1900 depicted in the example depicted is implemented by a transmitter chain in, for example, a mobile station.

In certain embodiments, UE 116 decides the number of UL and DL chains by jointly taking into account multiple factors. In operation 1905, UE 116 first checks one or more of, a temperature of UE 116, a signal strength, a battery level, or an MPE. For example, UE 116 checks where one or more of: the temperature is high; the signal strength is high, such as compared to the requirement for data rate; the battery level is low; or if the radiation does not meet MPE requirement. If none of the condition is met, in operation 1910, UE 116 can apply full-chain DL and UL operation, i.e., $N_{DL}=N_{UL}=N_{ch}$. Alternatively, if any one of the conditions is met, UE 116 further checks if the PMI feedback is configured in operation 1915. If the UE 116 does not receive the PMI feedback configuration, which means channel reciprocity is required for gNB 102 precoding, in operation 1920, UE 116 applies same number of sub chains for DL and UL, i.e., $N_{DL}=N_{UL}<N_{ch}$. Alternatively, if the PMI feedback is configured, UE 116 can apply different number of chains for DL and UL in operation 1925. In the process 1900, UE 116 applies a fewer number of chain for UL than DL to save the transmission power.

Duty Cycle Reduction Procedure

Figure 20:
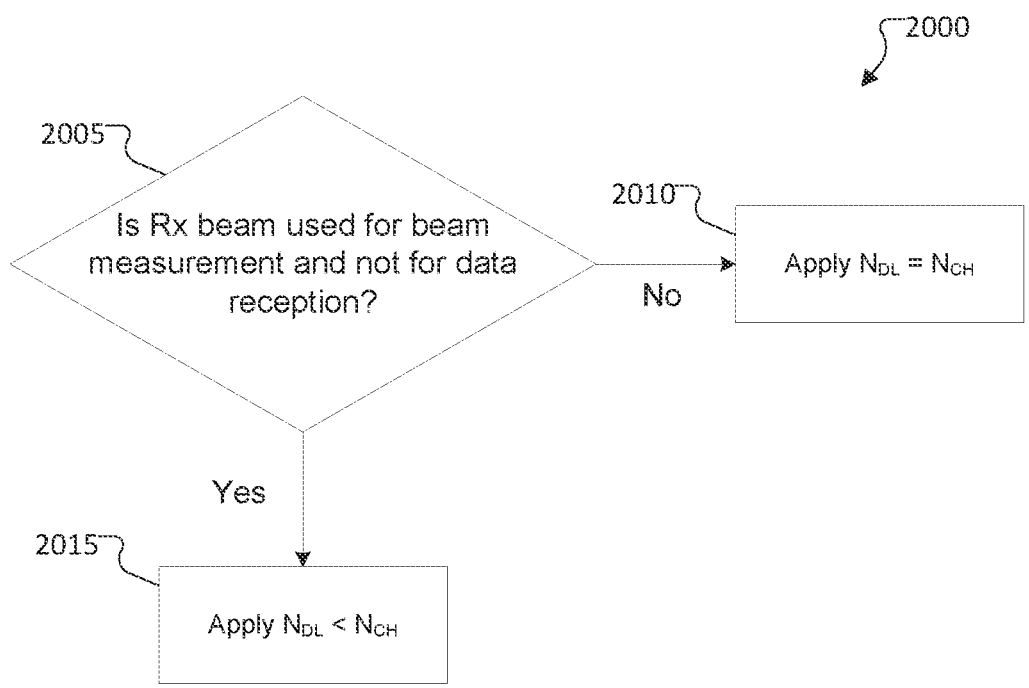
FIG. 20 illustrates an example process for antenna duty cycle reduction for Rx beam in accordance with the present disclosure.

FIG. 20 illustrates an example process for antenna duty cycle reduction for Rx beam in accordance with this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 2000 depicted in the example depicted is implemented by a transmitter chain in, for example, a mobile station.

In certain embodiments, UE 116 applies the sub-chain beams for beam measurement, but full-chain beams for data reception. In process 2000, UE 116 performs a UE antenna duty cycle reduction procedure in which UE 116 saves power and reduces heat when performing beam measurement with sub-chain beams, but maximizes signal quality when receiving data with full-chain beams. UE 116 can perform a similar procedure with respect to the Tx beam as well if there is uplink beam measurement.

In operation 2005, UE determines if a RX beam is used for beam measurement and not for data reception. If the RX beam is not used for beam measurement, UE 116 UE 116 can apply full-chain DL operation, i.e., $N_{DL}=N_{ch}$, in operation 2010. If the UE 116 determines that the RX beam is used for beam measurement, in operation 1920, UE 116 applies smaller number of sub chains for DL, i.e., $N_{DL}<N_{ch}$, in operation 2015.

Figure 21:
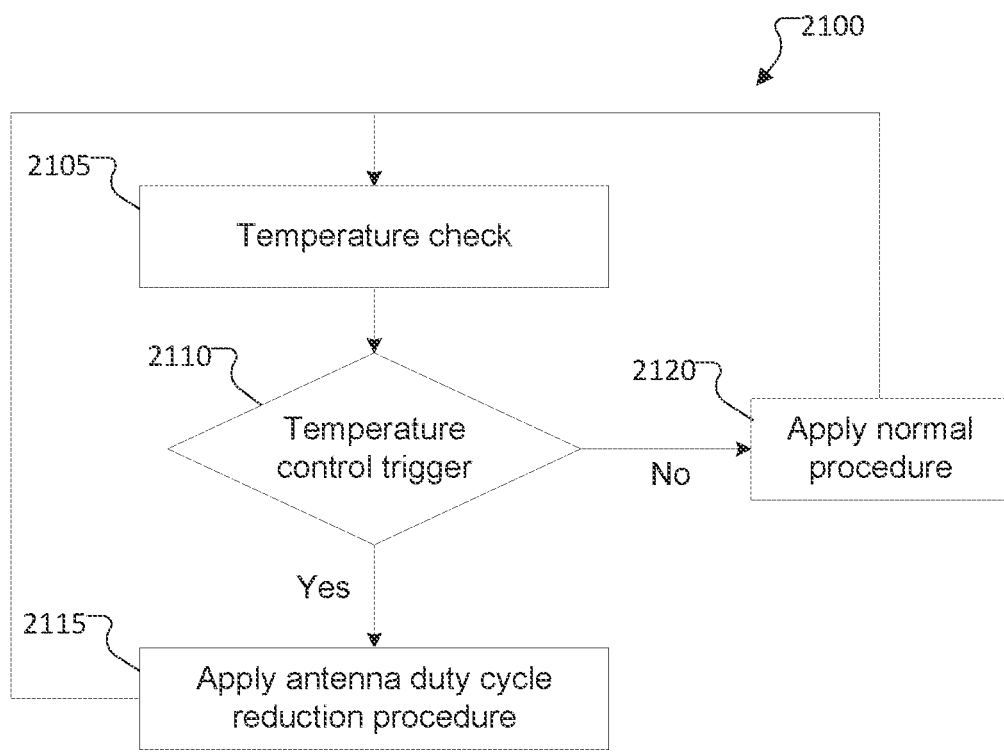
FIG. 21 illustrates an example process for antenna duty cycle reduction in accordance with the present disclosure.

FIG. 21 illustrates an example process for antenna duty cycle reduction in accordance with this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 2100 depicted in the example depicted is implemented by a transmitter chain in, for example, a mobile station.

In certain embodiments, UE 116 decides when to apply the antenna duty cycle reduction procedure according to the temperature. In operation 2105, UE 116 checks the temperature to determine if sub-chain should be applied. UE 116 can check the temperature periodically. If the temperature control is triggered in operation 2110, UE 116 applies the antenna duty cycle reduction procedure in operation 2115. Alternatively, in operation 2120, UE 116 applies the normal procedure, where the same number of chains are used for the measurement and data reception.

Beam Sweeping During the Change of Chains

When the number of chains changes, UE 116 can choose to 1) perform a full beam sweeping to decide the best new beam, or 2) perform a partial sweeping which only searches the nearby beams, or 3) elects not to search and directly applies the corresponding beam assuming the one-to-one mapping is perfect. In certain embodiments, if the number of chains changes slightly, UE 116 performs a partial search or does not sweep the beams at all. For example, if the chain size of the previous beam $(N_{DL}, N_{UL})$ and new beam $(N'_{DL}, N'_{UL})$ is close, i.e., $|N_{DL}-N'_{DL}|<\delta$ (or $|N_{UL}-N'_{UL}|<\delta$), UE 116 can assume that the inter-chain beam mapping is fairly well and thus ignores a full sweeping operation. Otherwise, UE 116 sweeps the entire beam codebook to decide upon a best new beam.

Beam Management Parameter Adjustment for Sub-Chain Beam Codebook

In certain embodiments, the beam management parameter could be adjusted as the UE 116 applies sub-chain operation. UE 116 usually sets RSRP threshold to trigger certain action in the beam management. For example, if the RSRP of the current antenna module drops below a threshold, sweep the other antenna modules to find a better module. The RSRP threshold should be adjusted if UE 116 applies sub-chain instead of full-chain operation. For instance, denoting the RSRP threshold for trigger module sweeping in the full-chain/sub-chain operation as $RSRP_{th}(N_{ch})$ and $RSRP_{th}(N_{DL})$, UE 116 sets $RSRP_{th}(1)<RSRP_{th}(2)< \ldots <RSRP_{th}(N_{ch})$. The threshold gap can be determined from the CDF curve of the spherical coverage. For example, if CDF curve of the full-chain codebook is 10 dB better than that of the 1-chain codebook at the 50%-tile (or at the 100%-tile or 20%-tile or on average), UE could set $RSRP_{th}(1)=RSRP_{th}(N_{ch})-10$ dB.

Per-Module Sub-Chain Control

The above sub-chain beam operation is not limited to the case of single module UE and can be applied to a UE with multiple modules.

In certain embodiments, the sub-chain beam operation of the multiple antenna modules is done separately. There could be multiple temperature sensors mounted on UE 116 and each sensor is disposed close to one antenna module. Therefore, if the temperatures of the modules are different, the different number of chains may be used. In addition, the signal strength of the modules can be different due to the antenna type (for example, patch or dipole), orientation, hand blockage, wireless channel, and. Thus, the number of chains to achieve the same SNR/throughput may be different across the modules, and UE 116 may apply separate sub-chain operations.

Beam Measurement Table Update when Changing the Number of Chains

In certain embodiments of a beam measurement (BM) operation, UE 116 can maintain a beam measurement table. In certain embodiments, when there is a change in the number of chains, UE 116 first maps its beam measurements table from the previous number of chains to the new number of chains. This mapping of measurement table, although maybe not perfect, could still be performed and better than a cold start measurement of the new sub-chain beams. This measurement provides UE 116 with an approximate measurement tables that UE 116 can operate with while UE 116 tries to flash out to the new table.

If the codebook is designed with the metric of "similarity score", the mapping can be performed by scaling the old measurement table with similarity score. If the measurement value for the previous beam, denoted beam pattern as $G_i(\theta,\phi)$ (in linear scale, not dB scale), is $V_G$ Watts or milliwatts, the beam measurement for the correspondence new beam, denoted as $B_i(\theta,\phi)$ (in linear scale, not dB scale), could be set as $V_{B_i} \approx s_i V_{G_i}$, where $s_i$ is the similarity score defined according to:

$$s_i = \frac{1}{\sum_{(\theta,\phi)} G_i^2(\theta, \phi)} \sum_{(\theta,\phi)} G_i(\theta, \phi) B_i(\theta, \phi) \qquad (3)$$

That is, $B_i(\theta,\phi)=s_i G_i(\theta,\phi)+\Delta(\theta,\phi)$, where $\Delta(\theta,\phi)$ is the residual beam pattern difference orthogonal to $G_i(\theta,\phi)$, i.e., $\Sigma_{(\theta,\phi)} G_i(\theta,\phi)\Delta(\theta,\phi)=0$. Therefore, if the channel gain is denoted as $\gamma(\theta,\phi)$, the beam measurements of the new beam is:

$$\Sigma_{(\theta,\phi)}\gamma(\theta,\phi)B_i(\theta,\phi)=\Sigma_{(\theta,\phi)}\gamma(\theta,\phi)(s_i G_i(\theta,\phi)+ \\ \Delta(\theta,\phi))=s_i\Sigma_{(\theta,\phi)}\gamma(\theta,\phi)G_i(\theta,\phi)+\Sigma_{(\theta,\phi)}\gamma(\theta,\phi)\Delta(\theta,\phi) \qquad (4)$$

Since the channel gain and the residual beam pattern difference are independent, the expectation of their inner product is zero. Therefore, the expectation of $V_{B_i}$ over the channel realization is equal to $s_i V_{G_i}$.

If the codebook is designed with the metric of "spherical coverage beam correspondence", the mapping can also be done by scaling the old measurement table. If the measurement value for the previous beam, denoted as $G_i(\theta,\phi)$, is $V_{G_i}$ Watts or milliwatts, the beam measurement for the correspondence new beam, denoted as $B_i(\theta,\phi)$, could be set as $s'_i V_{G_i}$ where $s'_i$ is the similarity score over the coverage region of the previous beam, denoted as $D_i$, defined according to:

$$s'_i = \frac{1}{\sum_{(\theta,\phi)\in D_i} G_i^2(\theta,\phi)} \sum_{(\theta,\phi)\in D_i} G_i(\theta,\phi) B_i(\theta,\phi) \quad (5)$$

If the codebook is designed with the metric of "spherical coverage" or generally without inter-chain beam correspondence, the mapping could be done as follows. First, find a beam from the previous codebook that is mostly close to the current beam $B_i(\theta,\phi)$. This can be performed by evaluating the similarity score as done above. Denoting the radiation pattern of the selected beam as $G_j(\theta,\phi)$. Second, scale the beam measurement of $G_j(\theta,\phi)$ with the similarity score between $G_j(\theta,\phi)$ and $B_i(\theta,\phi)$. Another method is to first project the beam pattern $B_i(\theta,\phi)$ over the previous codebook $G_k(\theta,\phi), 1\leq k \leq K$. If the projection is $B_i(\theta,\phi) = \alpha_1 G_1(\theta,\phi) + \alpha_2 G_2(\theta,\phi) + \ldots + \alpha_K G_K(\theta,\phi) + \Delta(\theta,\phi)$, then the measurement of the new beam could be set as $V_{B_i} \approx \alpha_1 V_{G_1} + \alpha_2 V_{G_2} + \ldots + \alpha_K V_{G_K}$.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope.

What is claimed is:

1. A user equipment (UE) in a wireless communication system, the UE comprising:
    a transceiver configured to receive, from a base station (BS), a precoding matrix indicator (PMI) feedback requirement; and
    a processor operably coupled to the transceiver and configured to:
        identify a full-chain beam for a downlink reception based on a beam sweeping operation to determine a candidate beam,
        determine, based on the PMI feedback requirement, a number of activated chains for an uplink transmission, and
        determine a sub-chain uplink transmission beam.

2. The UE of claim 1, wherein the processor is further configured to determine, based on a temperature of the UE, the number of activated chains for the uplink transmission using fewer chains for the uplink transmission when the temperature of the UE is higher than a threshold value.

3. The UE of claim 1, wherein the processor is further configured to determine, based on an uplink throughput requirement, the number of activated chains for the uplink transmission using fewer chains for the uplink transmission when the uplink throughput requirement is lower than a threshold.

4. The UE of claim 1, wherein the processor is further configured to determine, based on the PMI feedback requirement, the number of activated chains for the uplink transmission using same chains for an uplink and a downlink when the UE is not configured with a PMI feedback based on the PMI feedback requirement.

5. The UE of claim 1, wherein the processor is further configured to determine, based on a maximum permissible exposure (MPE), the number of activated chains for the uplink transmission using fewer chains for the uplink transmission when a radiation exposure is allowed within the MPE.

6. The UE of claim 1, wherein the processor is further configured to determine, based on a battery level, the number of activated chains for the uplink transmission using fewer chains for the uplink transmission when the battery level is lower than a threshold.

7. The UE of claim 1, wherein the processor is further configured to determine the number of activated chains for the uplink transmission based on at least one of a temperature control, an uplink throughput requirement, the PMI feedback requirement, a battery level, or an MPE.

8. The UE of claim 1, wherein the processor is further configured to determine, based on a full-chain downlink beam, the sub-chain uplink transmission beam without sweeping sub-chain beams, when an inter-chain beam correspondence exists, the inter-chain beam correspondence comprising a one-to-one beam mapping between a sub-chain beam and a full-chain beam.

9. The UE of claim 1, wherein the processor is further configured to determine the sub-chain uplink transmission beam based on a partial beam sweeping operation including a corresponding sub-chain beam and nearby sub-chain beams when an inter-chain beam correspondence exists, the inter-chain beam correspondence comprising a one-to-one beam mapping between a sub-chain beam and a full-chain beam.

10. The UE of claim 1, wherein the processor is further configured to:
    determine sub-chain beams according to different metrics comprising at least one of a similarity, a spherical coverage, or a beam correspondence spherical coverage; and
    determine the sub-chain uplink transmission beam without the beam sweeping operation if one or more sub-chain beams are determined according to a metric comprising at least one of the similarity or the beam correspondence spherical coverage.

11. A method for operating a user equipment (UE), the method comprising:
    receiving, from a base station (BS), a precoding matrix indicator (PMI) feedback requirement;
    identifying a full-chain beam for a downlink reception from based on a beam sweeping operation to determine a candidate beam;
    determining, based on the PMI feedback requirement, a number of activated chains for an uplink transmission; and
    determining a sub-chain uplink transmission beam.

12. The method of claim 11, wherein determining the number of activated chains for uplink transmission comprises determining, based on a temperature of the UE, the number of activated chains for the uplink transmission using fewer chains for the uplink transmission when the temperature of the UE is higher than a threshold value.

13. The method of claim 11, wherein determining the number of activated chains for uplink transmission comprises herein determining the number of activated chains for uplink transmission comprises determining, based on an uplink throughput requirement, number of activated chains for the uplink transmission using fewer chains for the uplink transmission when the uplink throughput requirement is lower than a threshold.

14. The method of claim 11, wherein determining the number of activated chains for uplink transmission comprises determining, based on the PMI feedback requirement, the number of activated chains for the uplink transmission using same chains for an uplink and a downlink when the UE is not configured with a PMI feedback based on the PMI feedback requirement.

15. The method of claim 11, wherein determining the number of activated chains for uplink transmission comprises determining, based on a maximum permissible exposure (MPE), the number of activated chains for the uplink transmission using fewer chains for the uplink transmission when a radiation exposure is allowed within the MPE.

16. The method of claim 11, wherein determining the number of activated chains for uplink transmission comprises determining, based on a battery level, the number of activated chains for the uplink transmission using fewer chains for the uplink transmission when the battery level is lower than a threshold.

17. The method of claim 11, wherein determining the number of activated chains for uplink transmission comprises determining the number of activated chains for the uplink transmission based on at least one of a temperature control, an uplink throughput requirement, the PMI feedback requirement, a battery level, or an MPE.

18. The method of claim 11, wherein determining the sub-chain uplink transmission beam comprises determining, based on a full-chain downlink beam, the sub-chain uplink transmission beam without sweeping sub-chain beams, when an inter-chain beam correspondence exists, the inter-chain beam correspondence comprising a one-to-one beam mapping between a sub-chain beam and a full-chain beam.

19. The method of claim 11, wherein determining the sub-chain uplink transmission beam comprises determining the sub-chain uplink transmission beam based on a partial beam sweeping operation including a corresponding sub-chain beam and nearby sub-chain beams when an inter-chain beam correspondence exists, the inter-chain beam correspondence comprising a one-to-one beam mapping between a sub-chain beam and a full-chain beam.

20. The method of claim 11, further comprising:
   determining sub-chain beams according to different metrics comprising at least one of a similarity, a spherical coverage, or a beam correspondence spherical coverage; and
   wherein determining the sub-chain uplink transmission beam comprises determining the sub-chain uplink transmission beam without the beam sweeping operation if one or more sub-chain beams are determined according to a metric comprising at least one of the similarity or the beam correspondence spherical coverage.

* * * * *